US012020875B2

(12) United States Patent
Hoshi

(10) Patent No.: US 12,020,875 B2
(45) Date of Patent: Jun. 25, 2024

(54) SELECTING SWITCH

(71) Applicant: ALPS ALPINE CO., LTD., Tokyo (JP)

(72) Inventor: Naoki Hoshi, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 78 days.

(21) Appl. No.: 18/062,272

(22) Filed: Dec. 6, 2022

(65) Prior Publication Data

US 2023/0100532 A1 Mar. 30, 2023

Related U.S. Application Data

(63) Continuation of application No. PCT/JP2021/022931, filed on Jun. 16, 2021.

(30) Foreign Application Priority Data

Jun. 24, 2020 (JP) ................................ 2020-108975

(51) Int. Cl.
*H01H 13/30* (2006.01)
*H01H 13/14* (2006.01)
(Continued)

(52) U.S. Cl.
CPC ............ *H01H 13/30* (2013.01); *H01H 13/14* (2013.01); *H01H 13/20* (2013.01); *H01H 13/04* (2013.01)

(58) Field of Classification Search
CPC .......... H01H 13/26; H01H 13/28; H01H 5/00; H01H 5/08; H01H 1/36; H01H 13/12;
(Continued)

(56) References Cited

U.S. PATENT DOCUMENTS 10,867,760 B2 * 12/2020 Chen ...................... H01H 13/30
2017/0125189 A1 * 5/2017 Domzalski ............. H01H 13/14
2017/0372851 A1 * 12/2017 Tsukanaka ............... H01H 1/36

FOREIGN PATENT DOCUMENTS

JP S53-068888 6/1978
JP 2010-073662 4/2010
(Continued)

OTHER PUBLICATIONS

International Search Report for PCT/JP2021/022931 mailed on Aug. 24, 2021.

*Primary Examiner* — Ahmed M Saeed
(74) *Attorney, Agent, or Firm* — IPUSA, PLLC

(57) ABSTRACT

A selecting switch includes a case; a slider; a first actuator that rotates downward as pushed down by the slider; a second actuator holding a movable contact; a first contact and a second contact to be contacted by the movable contact; a cam protruding portion that is rotatably born by the second actuator and that contacts a lower inclined surface of the first actuator; a cam that rotates downward upon the cam protruding portion being pushed down while sliding on the lower inclined surface; and a biasing member that biases the cam upward, wherein, upon the first actuator being rotated downward by an angle, the cam protruding portion slides up on the lower inclined surface by biasing force from the biasing member, and the cam pulls up the second actuator, and a contact of the movable contact is switched from the first contact to the second contact.

16 Claims, 36 Drawing Sheets

(51) Int. Cl.
*H01H 13/20* (2006.01)
*H01H 13/04* (2006.01)

(58) Field of Classification Search
CPC .......... H01H 13/18; H01H 13/30; H01H 3/16; H01H 5/06; H01H 3/00; H01H 13/36; H01H 13/20; H01H 13/14; H01H 23/12; H01H 21/40; H01H 13/42; H01H 1/40
See application file for complete search history.

(56) References Cited

FOREIGN PATENT DOCUMENTS

| | | |
|---|---|---|
| JP | 2013-239372 | 11/2013 |
| JP | 2016-058271 | 4/2016 |

* cited by examiner

SELECTING SWITCH

CROSS-REFERENCE TO RELATED APPLICATIONS

This application is a continuation of International Application No. PCT/JP2021/022931, filed on Jun. 16, 2021 and designating the U.S., which claims priority to Japanese Patent Application No. 2020-108975, filed on Jun. 24, 2020. The contents of these applications are incorporated herein by reference in their entirety.

BACKGROUND OF THE INVENTION

1. Field of the Invention

The present disclosure relates to a selecting switch.

2. Description of the Related Art

So far, a selecting switch has been known that can select between a first conducting state and a second conducting state by a snap action in which a slider moves in a vertical direction by a pushing operation (see Patent Document 1 below, for example).

RELATED ART DOCUMENTS

Patent Documents

Patent Document 1: Japanese Patent Application Publication No. 2016-058271

SUMMARY OF THE INVENTION

In the selecting switch based on the snap action according to related art, a configuration has been adopted in which a slider is biased in a return direction using a coil spring arranged to elastically deform in the horizontal direction. Accordingly, the size in the horizontal direction has been unable to be reduced, and, thus, further reduction in the size of the of the selecting switch has been unable to be achieved.

A selecting switch according to an embodiment includes a case; a slider; a first actuator that rotates downward upon the slider being pushed down; a second actuator that holds a movable contact member; a first fixed contact and a second fixed contact to be contacted by the movable contact member, a cam protruding portion that is pivotably supported by the second actuator and that contacts a lower inclined surface of the first actuator, wherein the selecting switch further includes a cam that rotates downward upon the cam protruding portion being pushed down while the cam protruding portion slides on the lower inclined surface, and a biasing member that biases the cam upward, wherein, upon the first actuator being rotated downward by a predetermined angle, the cam pulls up the second actuator as a result that the cam protruding portion slides upward on the lower inclined surface by biasing force from the biasing member, so that a contact of the movable contact member switches from the first fixed contact to the second fixed contact.

DESCRIPTION OF THE EMBODIMENTS

Figure 1:
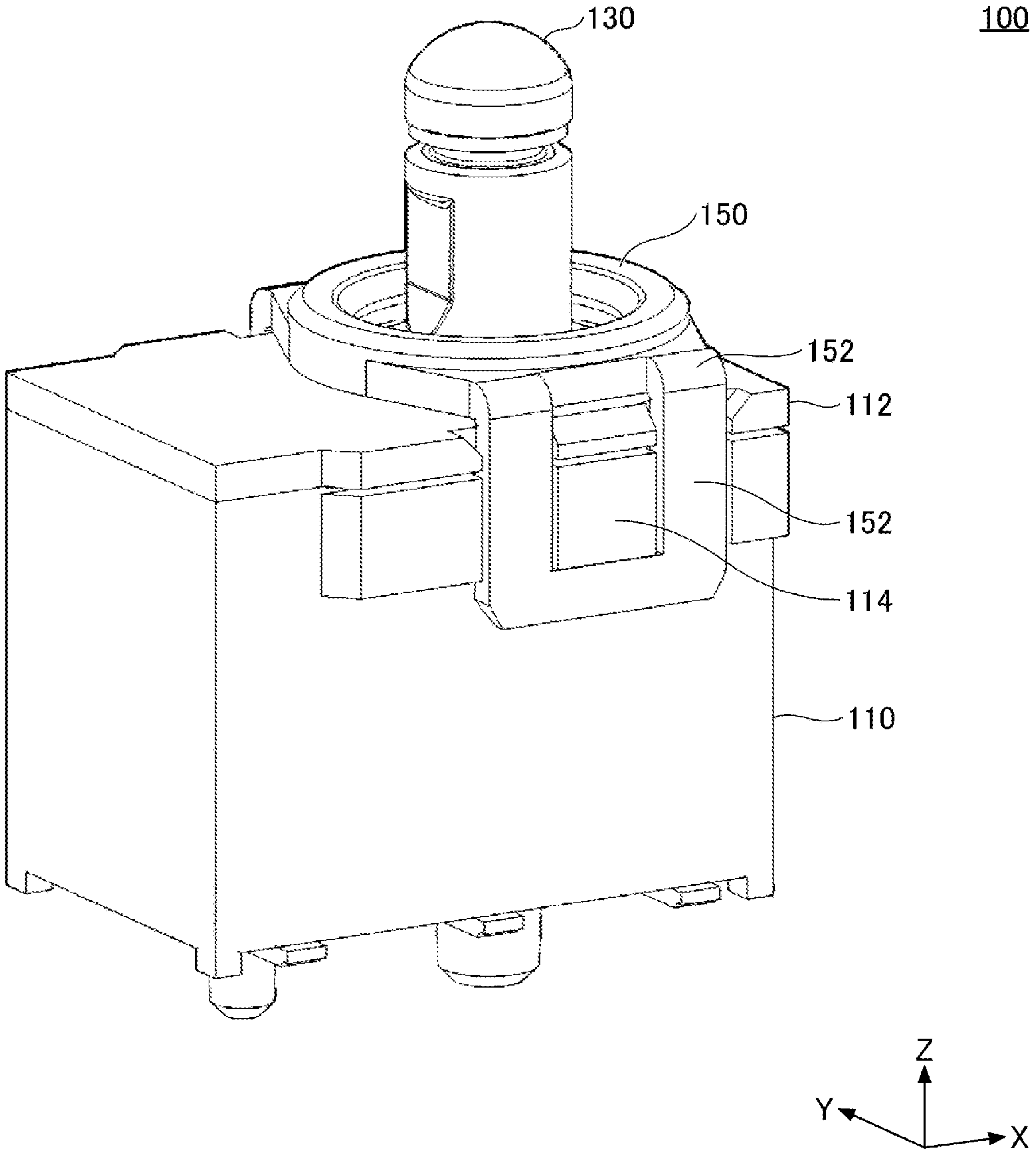
FIG. 1 is a perspective view of an external appearance of a selecting switch according to an embodiment.

In the following, embodiments are described with reference to the drawings. Note that, in the following descriptions, for convenience, a Z-axis direction in the drawings (a sliding direction of a slider 130) is assumed to be an up-down direction and a Y-axis direction in the drawings (a short direction of a case 110) is assumed to be a left-right direction.

(Overview of the Selecting Switch 100)

Figure 2:
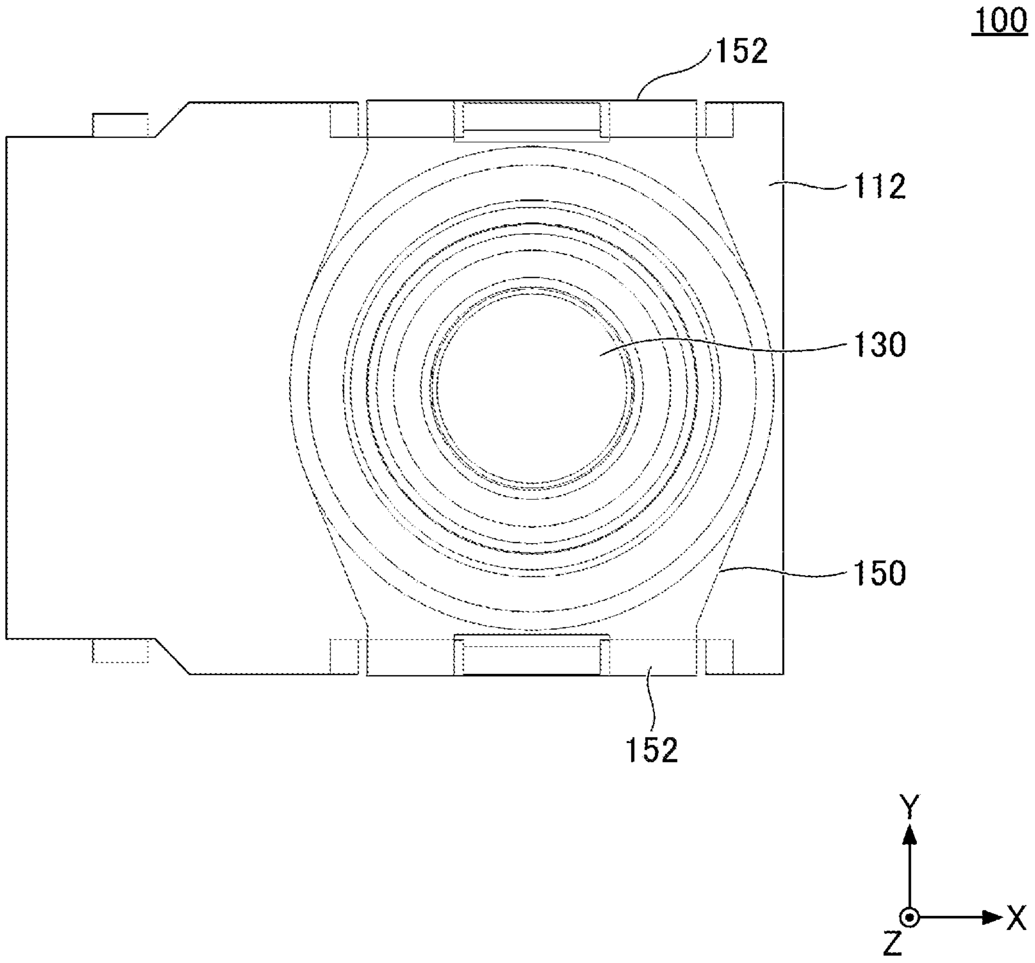
FIG. 2 is a plan view of a selecting switch according to an embodiment.
Figure 3:
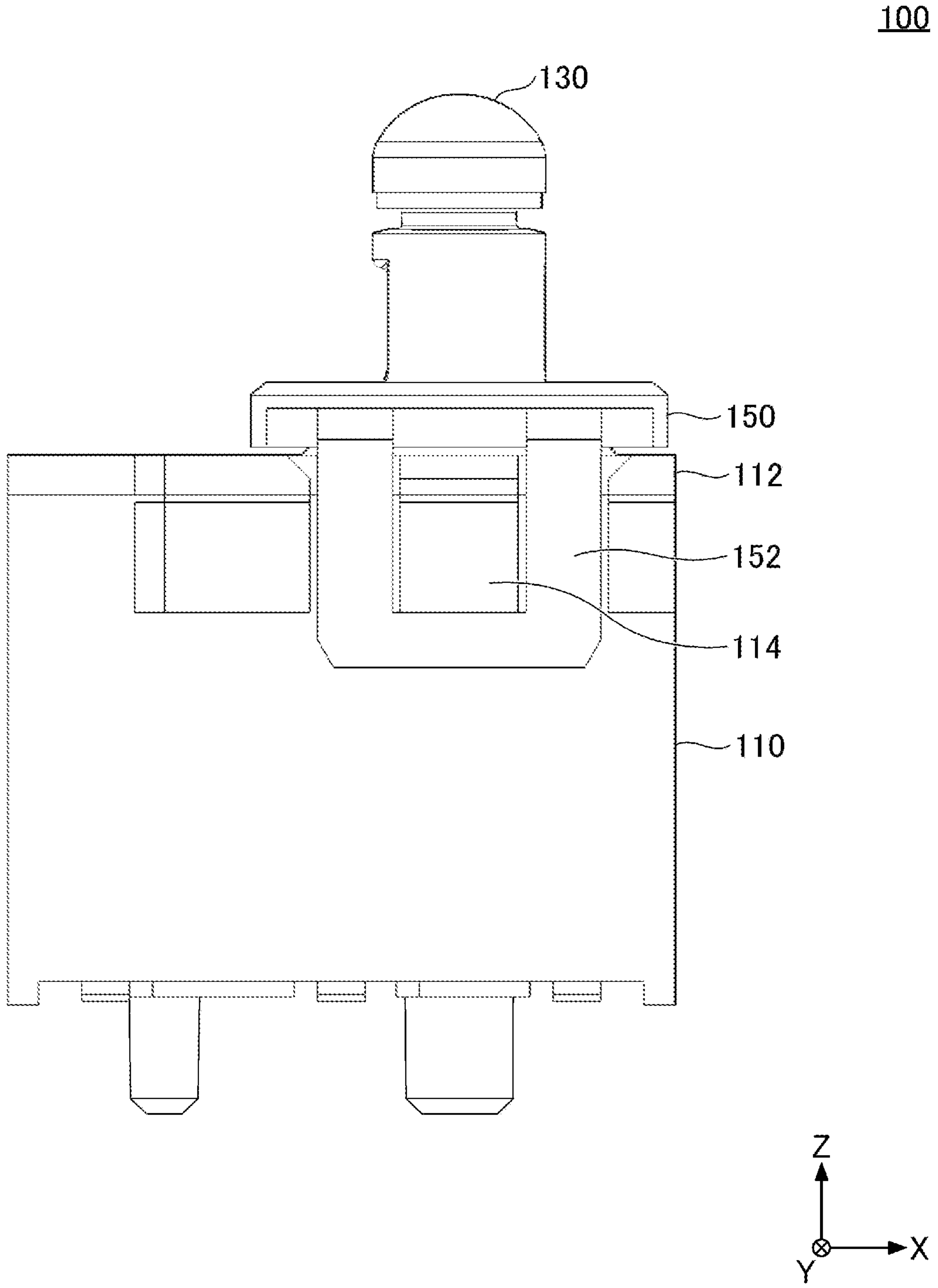
FIG. 3 is a side view of a selecting switch according to an embodiment.

FIG. 1 is a perspective view of an external appearance of a selecting switch 100 according to an embodiment. FIG. 2 is a plan view of the selecting switch 100 according to the embodiment. FIG. 3 is a side view of the selecting switch 100 according to the embodiment.

As illustrated in FIG. 1, the selecting switch 100 includes a case 110, a slider 130, and a holder 150.

The case 110 has a hollow structure with an opening formed on a top portion, and the case 110 has a rectangular solid shape. The opening at the top portion of the case 110 is closed by a lid 112 having a flat plate shape. The lid 112 has a circular opening 112A (see FIG. 4) for inserting the slider 130. On a lower surface of the lid 112, a columnar shaft support 112B is formed so that the columnar shaft support hangs downward. At the lower end of the shaft support 112B, a first shaft portion 112C (see FIG. 30) is formed, which has a convex shape protruding downward with a curved tip. The first shaft portion 112C pivotably supports a first actuator 161 from an upper side of the first actuator 161 by abutting against an upper bearing surface 161A (see FIG. 10 and FIG. 11) of the first actuator 161 included in a movable unit 160.

The slider 130 is a member having an approximately cylindrical shape to be pressed. The slider 130 is provided to pass through the opening 112A of the lid 112, and a part of the slider 130 is provided to protrude upward from the upper surface of the lid 112. The slider 130 is provided, so that the slider 130 can slide in the vertical direction (the Z-axis direction) with respect to the case 110.

The selecting switch 100 can select a conducting state as a result that the slider 130 is pressed. Specifically, in a state in which the slider 130 is not pressed, a state of the selecting switch 100 is a first conducting state. Subsequently, upon the slider 130 being pressed, the selecting switch 100 switches the conducting state to a second conducting state.

The holder 150 is a member having an annular shape that covers the top surface of the lid 112 and surrounds the slider 130. The holder 150 has a pair of hooks 152 hanging downward from an outer periphery of the holder 150. The holder 150 is attached to the case 110 by engaging the pair of hooks 152 with a pair of claws 114. Each of the pair of the claws 114 is formed on a corresponding one of a pair of parallel side surfaces of the case 110. As a result, the holder 150 secures the lid 112 to the case 110. For example, the holder 150 is formed by processing a metal plate.

(Configuration of the Selecting Switch 100)

Figure 4:
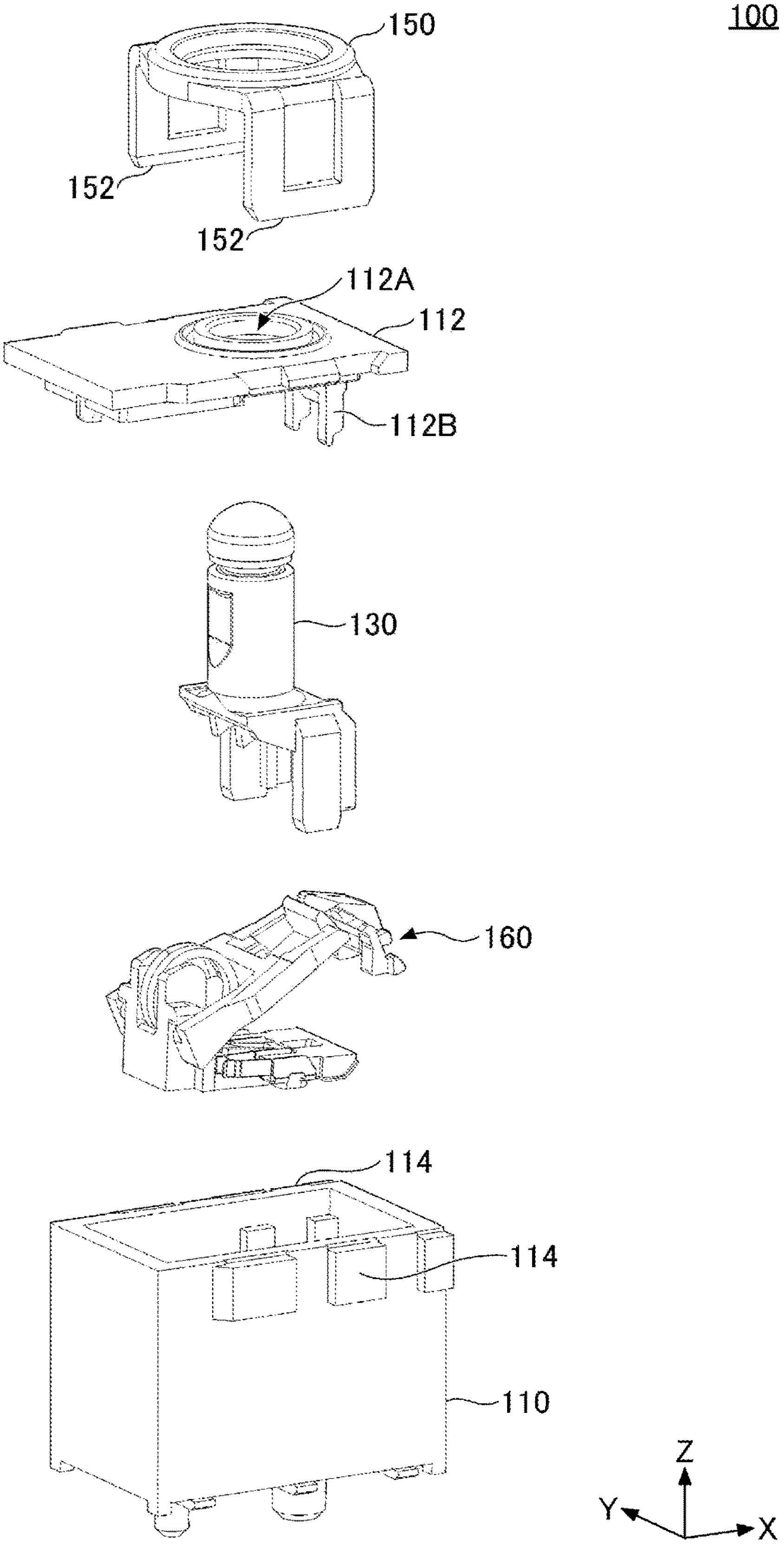
FIG. 4 is an exploded perspective view of a selecting switch according to an embodiment.
Figure 5:
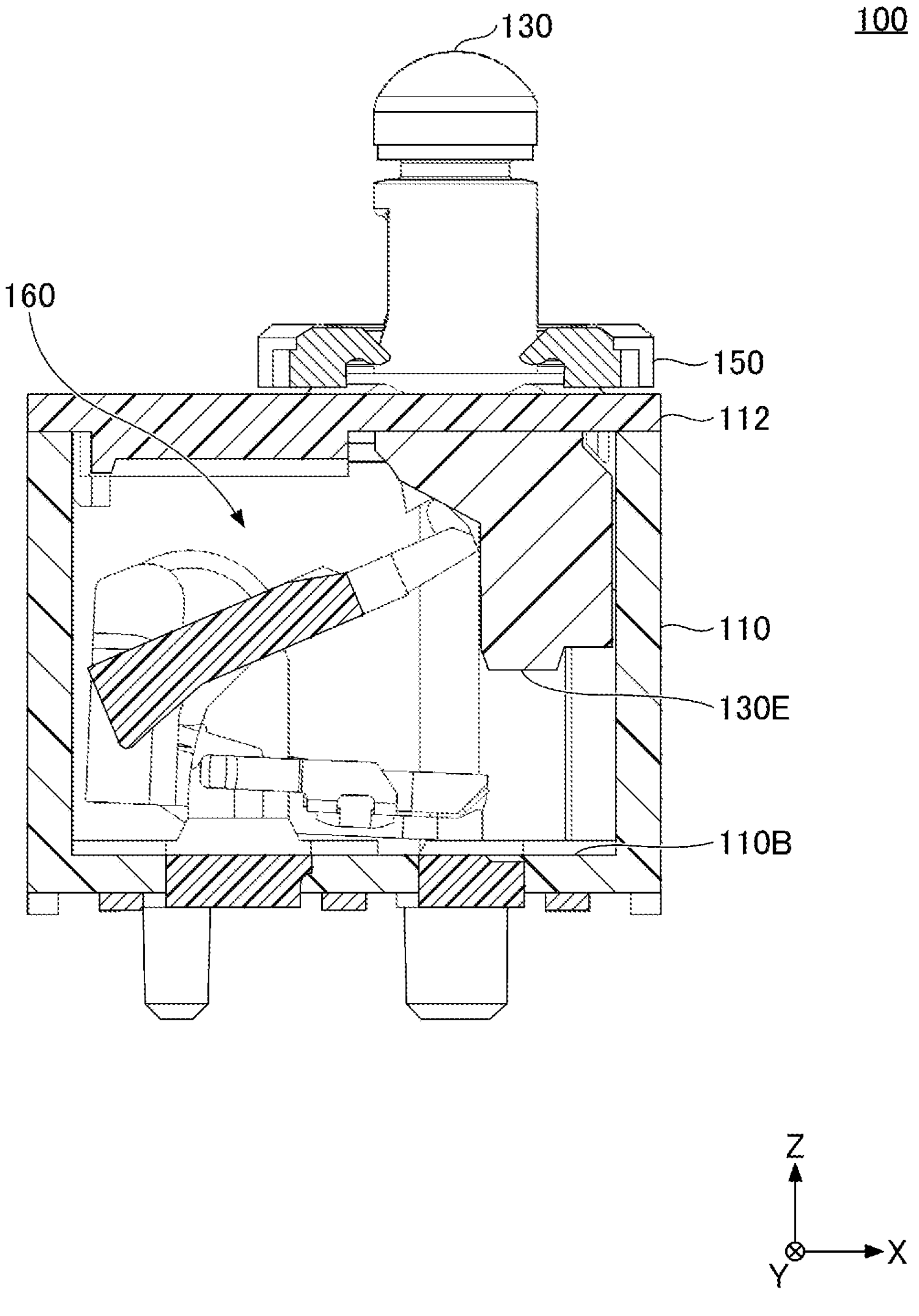
FIG. 5 is a cross-sectional view of a selecting switch according to an embodiment.
Figure 6:
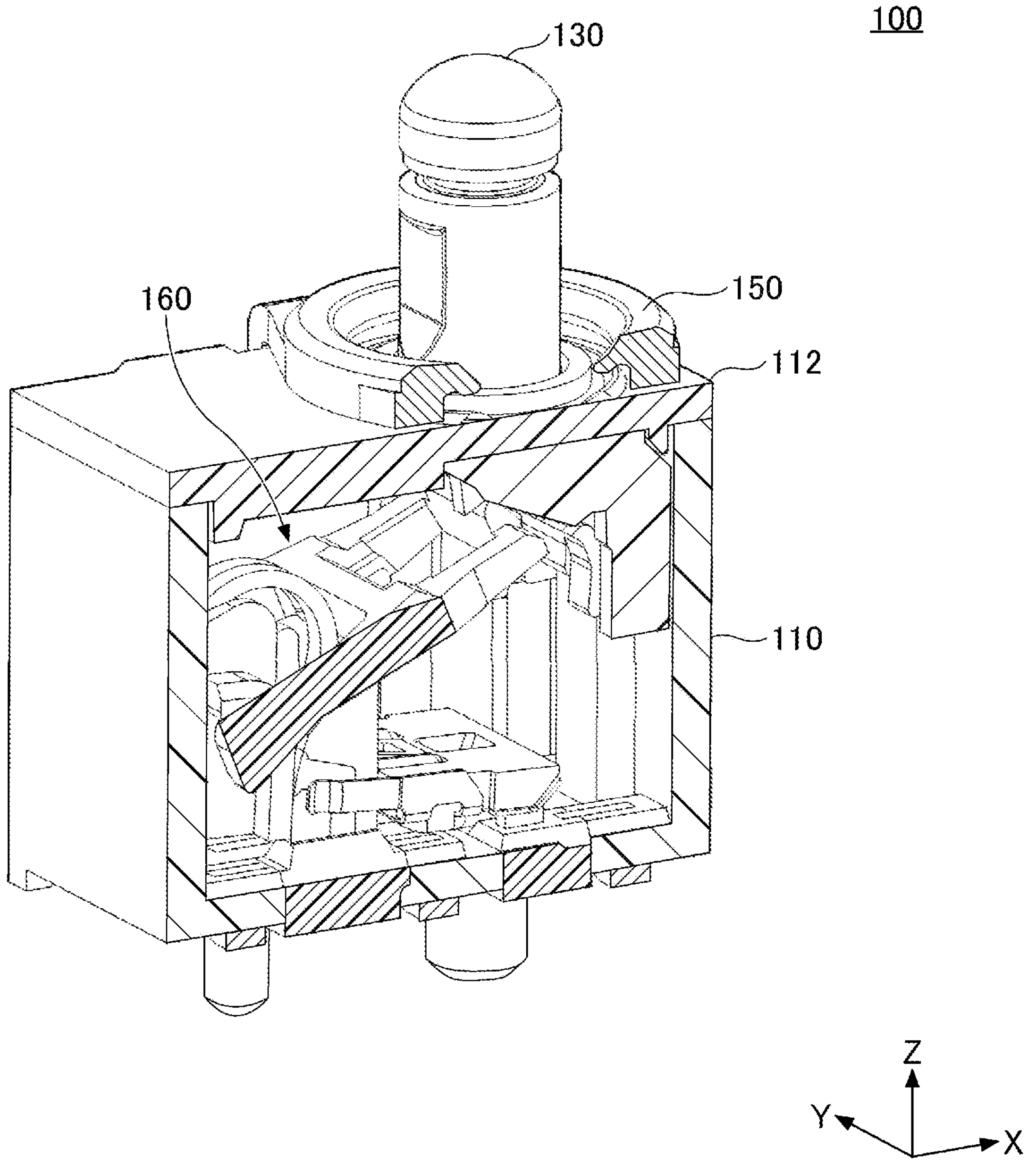
FIG. 6 is a perspective cross-sectional view of a selecting switch according to an embodiment.

FIG. 4 is an exploded perspective view of the selecting switch 100 according to an embodiment. FIG. 5 is a cross-sectional view of the selecting switch 100 according to an embodiment. FIG. 6 is a perspective cross-sectional view of the selecting switch 100 according to an embodiment.

As illustrated in FIG. 4 through FIG. 6, the selecting switch 100 is famed to include the holder 150, the lid 112, the slider 130, the movable unit 160, and the case 110. That is, the selecting switch 100 further includes the movable unit 160 in addition to the configuration described in FIG. 1 through FIG. 3.

The movable unit 160 is provided inside the case 110. The movable unit 160 is famed of a combination of multiple movable components. The movable unit 160 switches a conducting state of the selecting switch 100 between a first conducting state and a second conducting state by a snap action in which the movable unit 160 moves according to vertical movements of the slider 130 caused by an operation to press the slider 130. A specific configuration of the movable unit 160 is described below with reference to FIG. 10 and FIG. 11.

(Internal Configuration of the Case 110)

Figure 7:
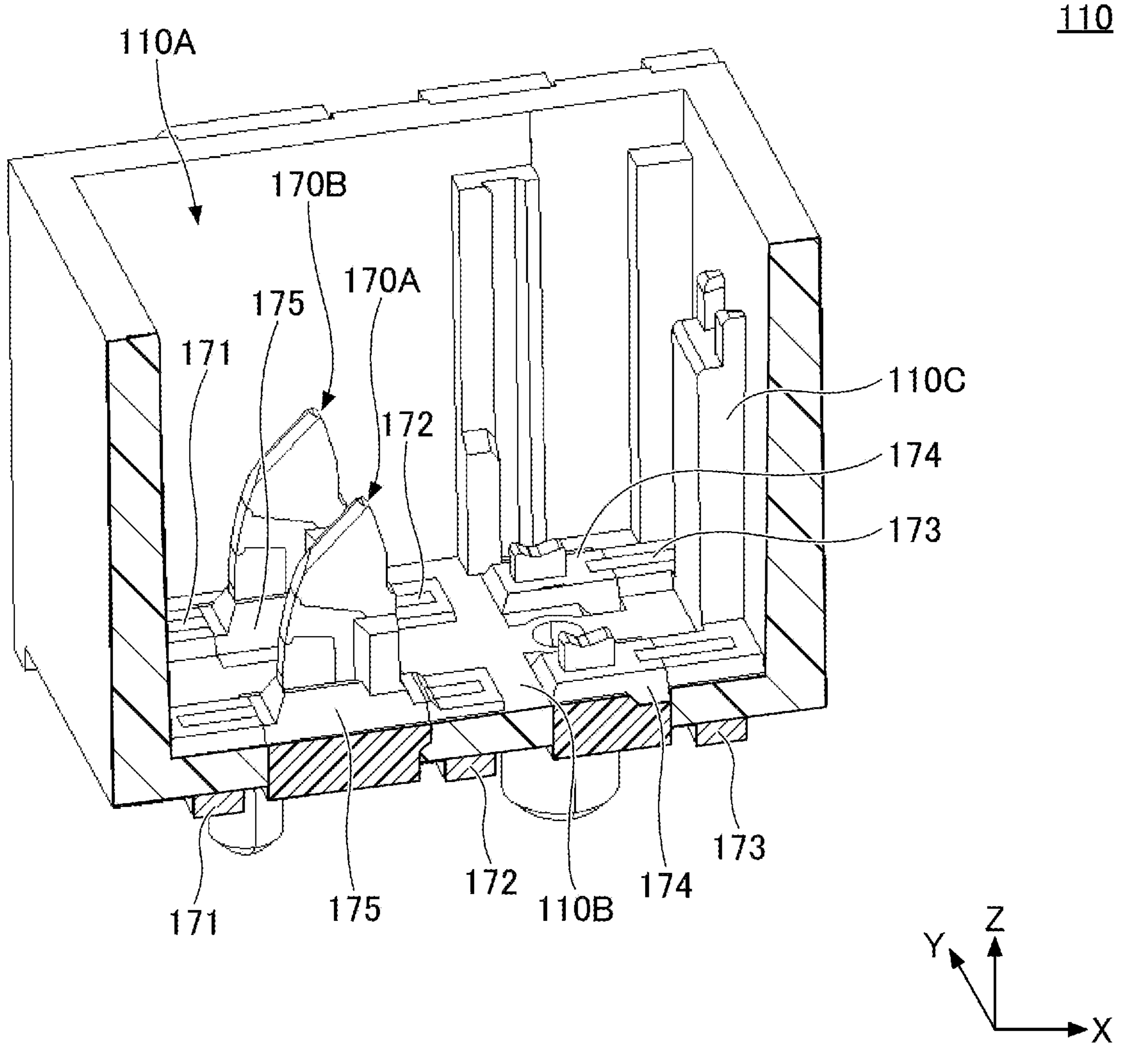
FIG. 7 is a cross-sectional view of a case included in a selecting switch according to an embodiment.
Figure 8:
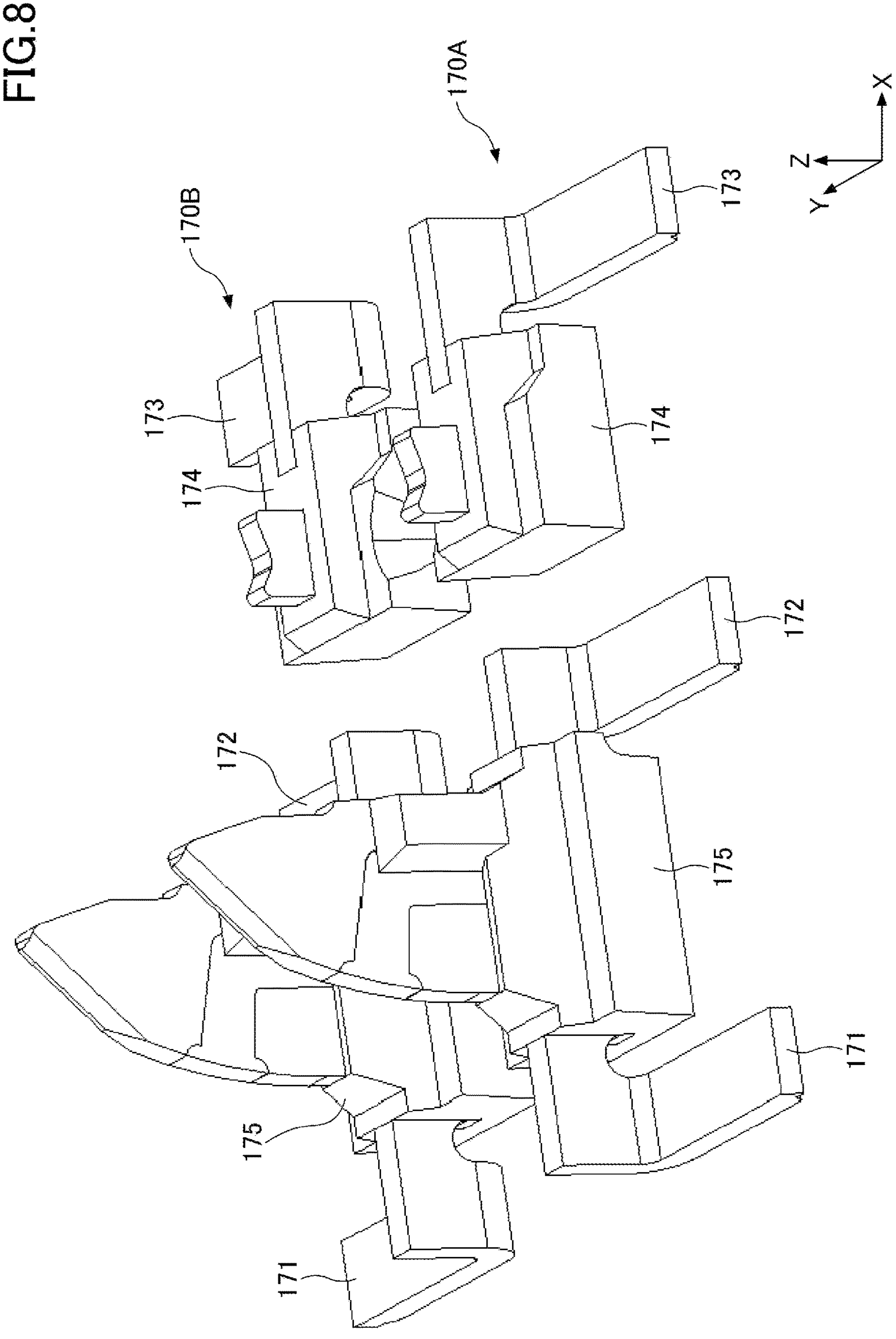
FIG. 8 is a perspective view of an external appearance of a terminal included in a selecting switch according to an embodiment.
Figure 9:
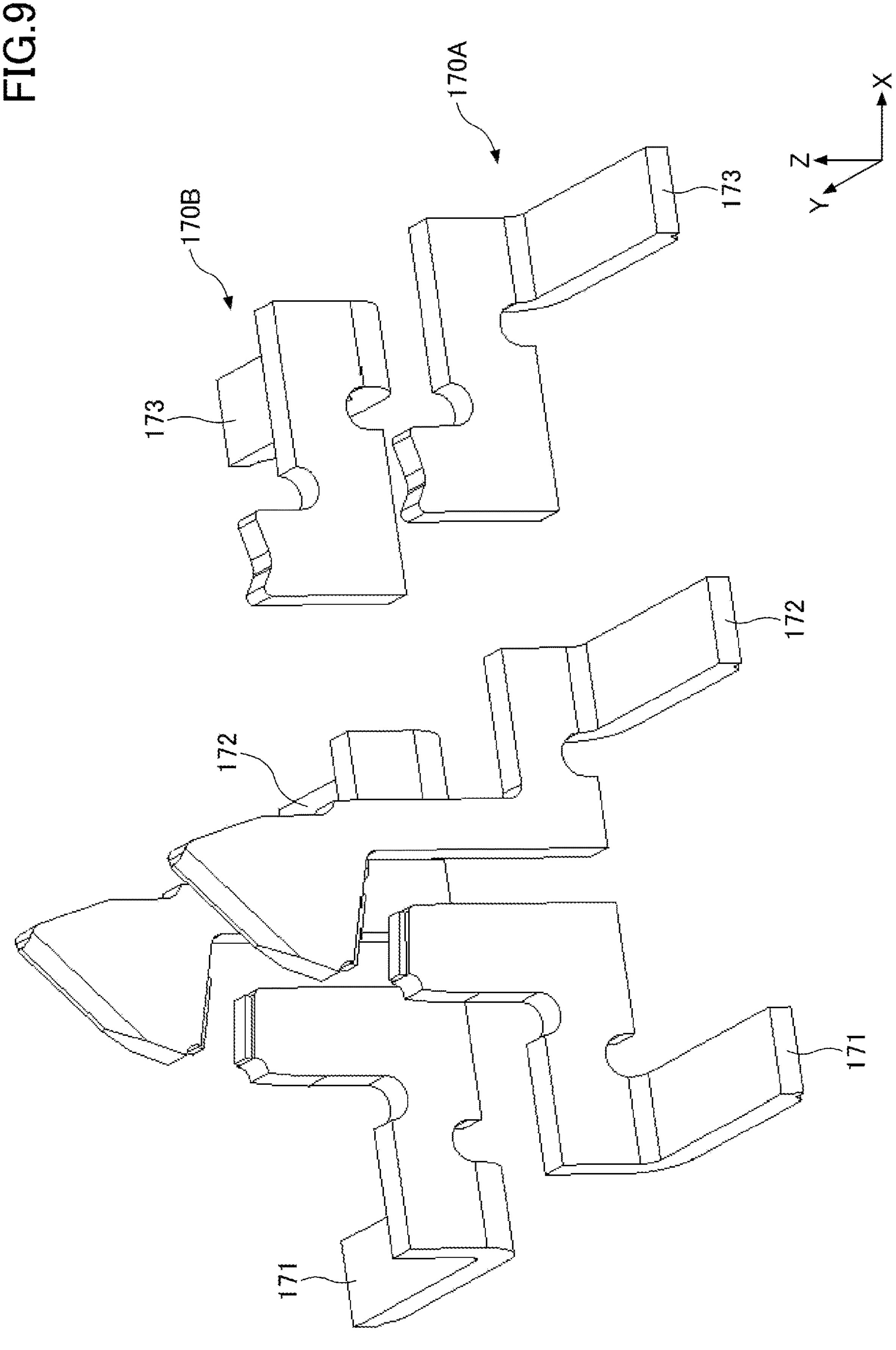
FIG. 9 is a perspective view of an external appearance of a terminal (in a state in which a terminal holder is omitted) included in a selecting switch according to an embodiment.

FIG. 7 is a cross-sectional view of the case 110 included in the selecting switch 100 according to an embodiment. FIG. 8 is a perspective view of an external appearance of a terminal 170 included in the selecting switch 100 according to an embodiment. FIG. 9 is a perspective view of an external appearance of the terminal 170 (in a state in which terminal holders 174 and 175 are omitted) included in the selecting switch 100 according to an embodiment.

As illustrated in FIG. 7, the case 110 has a space 110A with the top portion having the opening. A portion of the lower side of the slider 130 and the movable unit 160 are accommodated in the space 110A. For example, the case 110 is famed by injection molding of a relatively hard insulating material (e.g., a hard resin).

As illustrated in FIG. 7, a guide rib 110C is formed on an inner wall surface at a positive side in the X-axis direction exposed in the space 110A in the case 110. The guide rib 110C has a constant width in the Y-axis direction, and the guide rib 110C extends linearly in the vertical direction (Z-axis direction). The guide rib 110C is provided to guide the first actuator 161 to slide downward. A second shaft portion 110D (see FIG. 25) formed at an upper corner of the guide rib 110C pivotably supports the first actuator 161 from the lower side of the first actuator 161 by abutting against a lower bearing surface 161F of the first actuator 161.

Furthermore, as illustrated in FIG. 7, on a bottom 110B exposed to the space 110A in the case 110, two sets of the terminals 170 (the terminals 170A and 170B) are arranged side by side in the left and right directions (the Y-axis direction). The terminal 170A is provided on the negative side in the Y-axis direction on the bottom 110B. The terminal 170B is provided on the positive side in the Y-axis direction on the bottom 110B. The terminal 170A and the terminal 170B are linearly symmetrical to each other with a straight line extending in the X-axis direction at their middle position as a symmetric axis.

As illustrated in FIG. 7 through FIG. 9, each of the terminals 170A and 170B has a first fixed contact 171, a second fixed contact 172, a third fixed contact 173, a terminal holder 174, and a terminal holder 175.

Each of the fixed contacts 171 through 173 is formed by processing a metal plate (e.g., pressing). Each of the fixed contacts 171 through 173 has a standing shape perpendicular to the bottom 110B at one end of the contact, and a shape passing through the bottom 110B and extending along the bottom surface of the case 110 toward the sides of the case 110 at the other end.

Each of the fixed contacts 171 through 173 provided in the terminal 170A has a shape extending toward the negative side in the Y-axis direction of the case 110. Each of the fixed contact 171 through 173 provided in the terminal 170B has a shape extending toward the positive side in the Y-axis direction of the case 110.

The third fixed contact 173 is provided at the positive side in the X-axis direction relative to the center in the X-axis direction on the bottom 110B. The third fixed contact 173 is held by the terminal holder 174. The terminal holder 174 is integrally famed with the third fixed contact 173 by using an insulating material.

The second fixed contact 172 is provided at the center in the X-axis direction on the bottom 110B. The first fixed contact 171 is provided at the negative side in the X-axis direction relative to the center in the X-axis direction on the bottom 110B. The second fixed contact 172 and the first fixed contact 171 are held by the terminal holder 175. The terminal holder 175 is integrally famed with the second fixed contact 172 and the first fixed contact 171 by using an insulating material.

In the selecting switch 100, in a first conducting state (a state in which the slider 130 is not pressed), the first fixed contact 171 and the third fixed contact 173 are electrically conducted to each other through a movable contact member 165 (see FIG. 10 and FIG. 11) provided in the movable unit 160.

Furthermore, in the selecting switch 100, in a second conducting state (a state in which the slider 130 is pressed), the second fixed contact 172 and the third fixed contact 173 are electrically conducted to each other through the movable contact member 165 provided in the movable unit 160.

(Configuration of Movable Unit 160)

Figure 10:
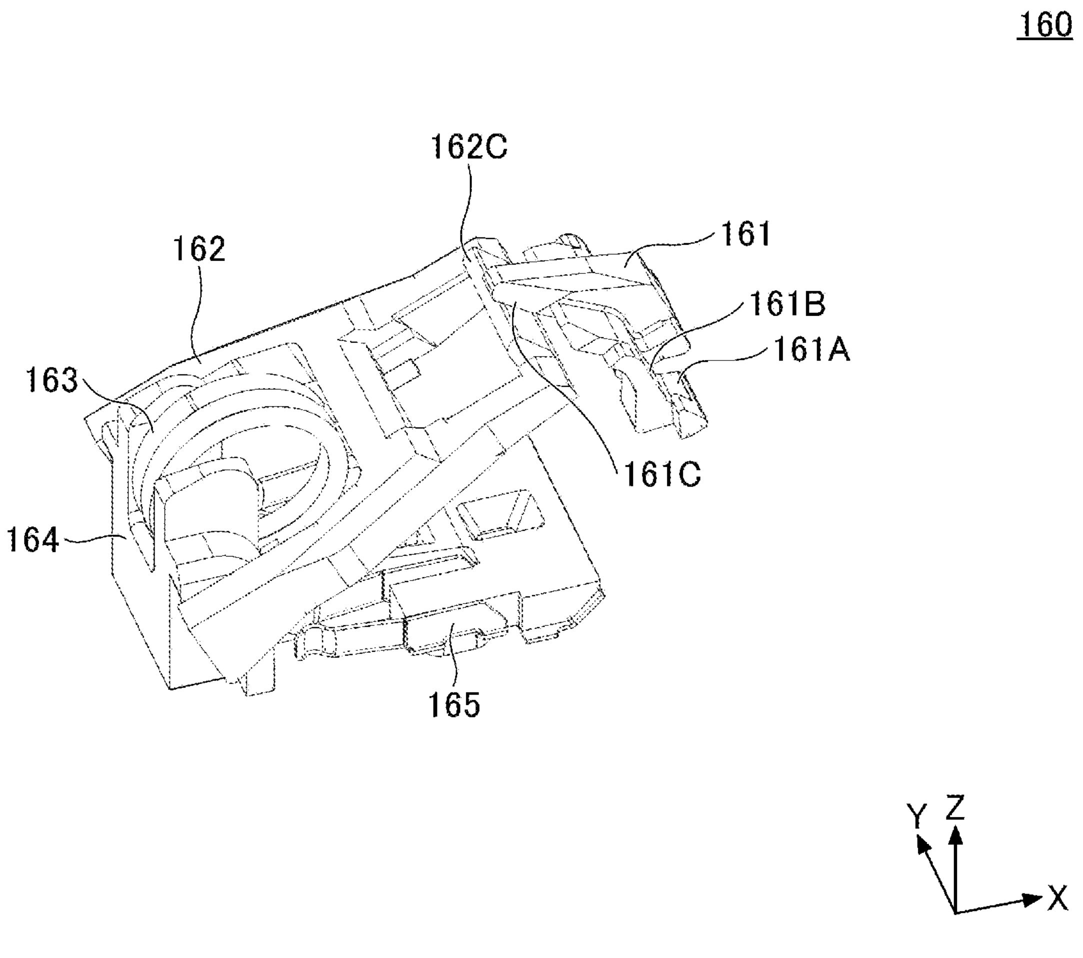
FIG. 10 is a perspective view of an external appearance of a movable unit included in a selecting switch according to an embodiment.
Figure 11:
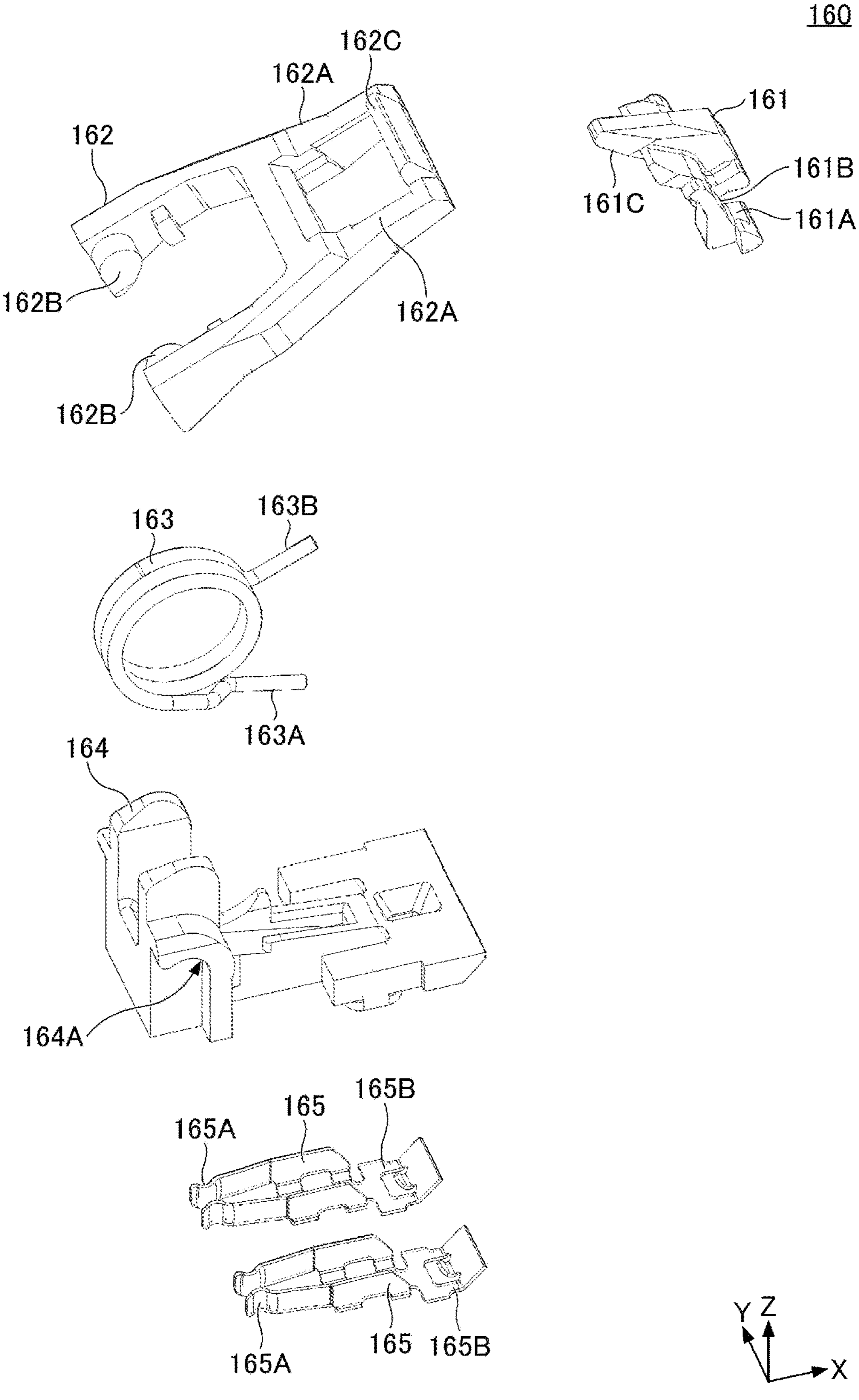
FIG. 11 is an exploded perspective view of a movable unit included in a selecting switch according to an embodiment.

FIG. 10 is an external perspective view of the movable unit 160 provided in the selecting switch 100 according to an embodiment. FIG. 11 is an exploded perspective view of the movable unit 160 provided in the selecting switch 100 according to an embodiment.

As illustrated in FIG. 10 and FIG. 11, the movable unit 160 includes the first actuator 161, a cam 162, a torsion spring 163, a second actuator 164, and the pair of the movable contact members 165. From among these components, the cam 162, the torsion spring 163, the second actuator 164, and the pair of the movable contact members 165 are combined and integrated with each other as illustrated in FIG. 10.

The first actuator 161 is an arm shaped member extending from the positive side in the X-axis direction of the case 110 to the negative side in the X-axis direction. The first actuator 161 is rotatably provided with respect to the inner wall surface on the positive side in the X-axis direction of the case 110, with the upper bearing surface 161A and the lower bearing surface 161F provided at the rear end as the center of rotation. The rotatable configuration of the first actuator 161 is described below after FIG. 23. The first actuator 161 rotates downward upon being pressed by the slider 130 at the upper contact surface 161B provided at each step on both sides in the left and right direction (the Y-axis direction). At this time, the first actuator 161 pushes down the cam 162 on the lower inclined surface 161C provided on the lower side of the center of the tip side (the negative side in the X-axis direction). Upon the first actuator 161 being rotated downward by a predetermined angle, a further downward rotation by the slider 130 is restricted. When the first actuator 161 is further pushed downward by the slider 130 from the state in which the downward rotation is restricted (i.e., during over stroke of the slider 130), the first actuator 161 slides downward with the slider 130 along the guide rib 110C (see FIG. 7) formed on the inner wall surface at the positive side in the X-axis direction of the case 110, while maintaining the state in which the first actuator 161 is rotated by the predetermined angle.

The cam 162 is a rotatable arm-shaped member extending obliquely upward from the negative side in the X-axis direction to the positive side in the X-axis direction in the space 110A of the case 110. The cam 162 has a pair of right and left arms 162A extending obliquely upward from the negative side in the X-axis direction to the positive side in the X-axis direction. Each rear end (the end at the negative side of the X-axis direction) of the pair of the arms 162A is provided with a rotating shaft portion 162B projecting inward. In the cam 162, the rotating shaft portion 162B is rotatably supported by a shaft support 164A formed at the rear end of the second actuator 164 (the end at the negative side in the x-axis direction). The cam 162 is biased upward by the torsion spring 163, which is a biasing member. A tip of the cam 162 (the end at the negative side in the X-axis direction) includes a cam protruding portion 162C that has an upwardly convex shape with a curved tip. Upon the cam protruding portion 162C being pressed downward while sliding on the lower inclined surface 161C of the first actuator 161, the cam 162 is rotated downward with the rotating shaft portion 162B as the center of rotation while elastically deforming the torsion spring 163. In the cam 162, when the slider 130 is pushed down to a predetermined height position, the cam protruding portion 162C slides up on the lower inclined surface 161C of the first actuator 161, so that the rotating shaft portion 162B pulls up the shaft support 164A of the second actuator 164. As a result, the cam 162 switches the contact of the movable contact members 165 held by the second actuator 164 from the first fixed contact 171 to the second fixed contact 172.

The torsion spring 163 is a metal member with elasticity. The torsion spring 163 biases the upper surface of the second actuator 164 downward at one arm 163A, and the torsion spring 163 biases the cam 162 upward at the other arm 163B.

The second actuator 164 rotatably supports the rotating shaft portion 162B of the cam 162 by the shaft support 164A. The second actuator 164 also holds the pair of the movable contact members 165. The second actuator 164 is pressed against the inner bottom surface of the case 110 by the biasing force from the torsion spring 163. In the second actuator 164, the shaft support 164A is instantaneously pulled upward by the rotating shaft portion 162B of the cam 162 when the slider 130 is pushed down to a predetermined height position. As a result, the second actuator 164 instantly switches a contact position of a first contact point 165A provided at the rear end of each of the pair of the movable contact members 165 from the first fixed contact 171 to the second fixed contact 172, and the second actuator 164 performs a snap action operation.

The movable contact member 165 is an electrically conductive member extending in the X-axis direction. A second contact point 165B provided at the other end (the positive end in the X-axis direction) of the movable contact member 165 contacts the third fixed contact 173. The first contact point 165A provided at one end (the end at the negative side in the X-axis direction) of the movable contact member 165 contacts the first fixed contact 171 in the first conducting state, and the first contact point 165A contacts the second fixed contact 172 in the second conducting state. For example, the movable contact member 165 is formed by processing a thin metal plate. The first contact point 165A has a shape to clump the first fixed contact 171 and the second fixed contact 172 between the left and right sides, and the first contact point 165A has a shape that can be elastically defamed in the left and right directions. As a result, the first contact point 165A can ensure to clump the first fixed contact 171 and the second fixed contact 172 between the left and right sides, and, thus, the first contact point 165A can prevent a failure in contact with the first fixed contact 171 and the second fixed contact 172.

(Operation of the Selecting Switch 100)

FIG. 12 through FIG. 22 are diagrams illustrating an operation of the selecting switch 100 according to an embodiment.

<First State>

Figure 12:
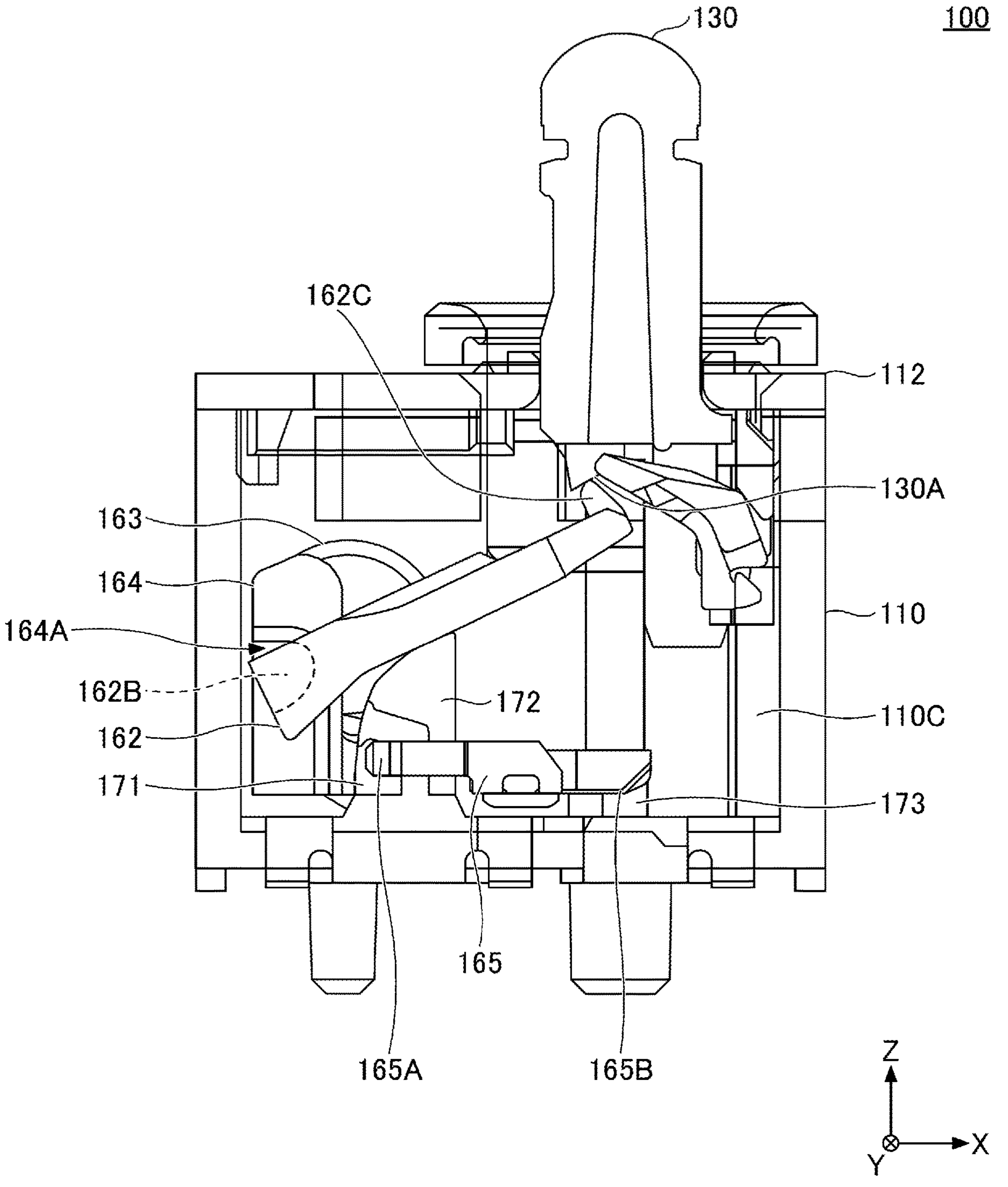
FIG. 12 is a diagram illustrating an operation of a selecting switch according to an embodiment.

FIG. 12 represents a state (the first state) in which the slider 130 is not pressed. In the first state, a pressing surface 130A provided at the lower end of the slider 130 contacts the cam protruding portion 162C provided at the tip of the cam 162. Furthermore, in the first state, the movable contact member 165 held by the second actuator 164 is in a horizontal state, the first contact point 165A contacts the first fixed contact 171, and the second contact point 165B contacts the third fixed contact 173. That is, the selecting switch 100 is in the first conducting state.

<Second State>

Figure 13:
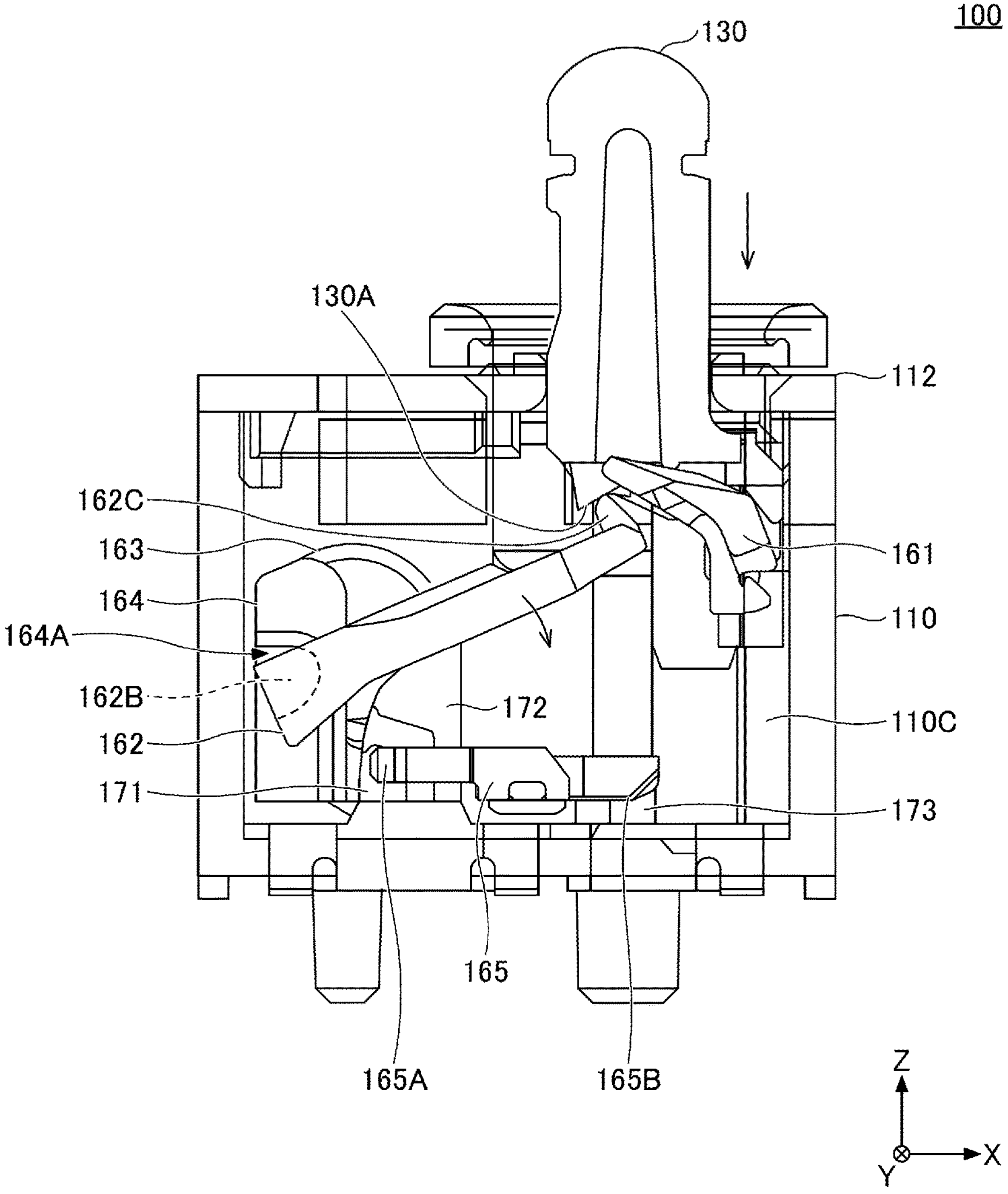
FIG. 13 is a diagram illustrating an operation of a selecting switch according to an embodiment.

Upon starting the operation to push the slider 130 from the first state illustrated in FIG. 12, the pressing surface 130A of the slider 130 pushes down the cam protruding portion 162C of the cam 162 as illustrated in FIG. 13. As a result, the cam 162 starts to rotate downward with the rotating shaft portion 162B borne by the shaft support 164A of the second actuator 164 as the center of rotation.

Then, as illustrated in FIG. 13, after the slider 130 starts sliding downward, when the slider 130 slides slightly downward, a pressing part 130B (see FIG. 31) on each side in the left-right direction (the Y-axis direction) of the slider 130 contacts an upper contact surface 161B on each side in the left-right direction (Y-axis direction) of the first actuator 161. As a result, the slider 130 starts pushing down the first actuator 161, in addition to pushing down the cam 162. By being pushed down by the pressing part 130B of the slider 130, the first actuator 161 starts to rotate downward with the first shaft portion 112C as the center of rotation.

<Third State>

Figure 14:
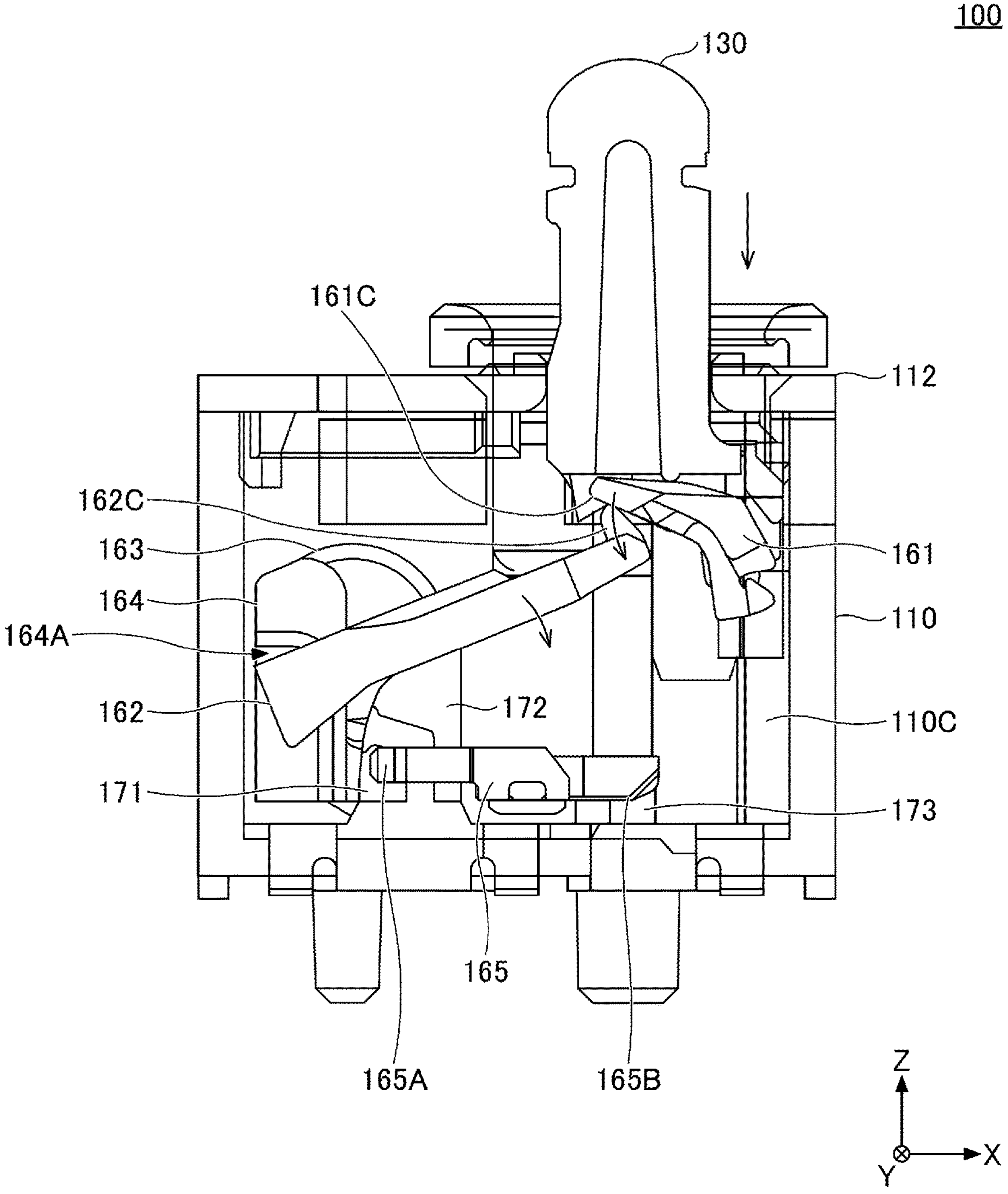
FIG. 14 is a diagram illustrating an operation of a selecting switch according to an embodiment.

Furthermore, when the slider 130 slides slightly downward from the second state illustrated in FIG. 13, a lower inclined surface 161C of the first actuator 161 contacts the cam protruding portion 162C of the cam 162, as illustrated in FIG. 14. Subsequently, the cam protruding portion 162C of the cam 162 is separated from the pressing surface 130A of the slider 130, and the cam protruding portion 162C is pushed down by the lower inclined surface 161C of the first actuator 161.

<Fourth State>

Figure 15:
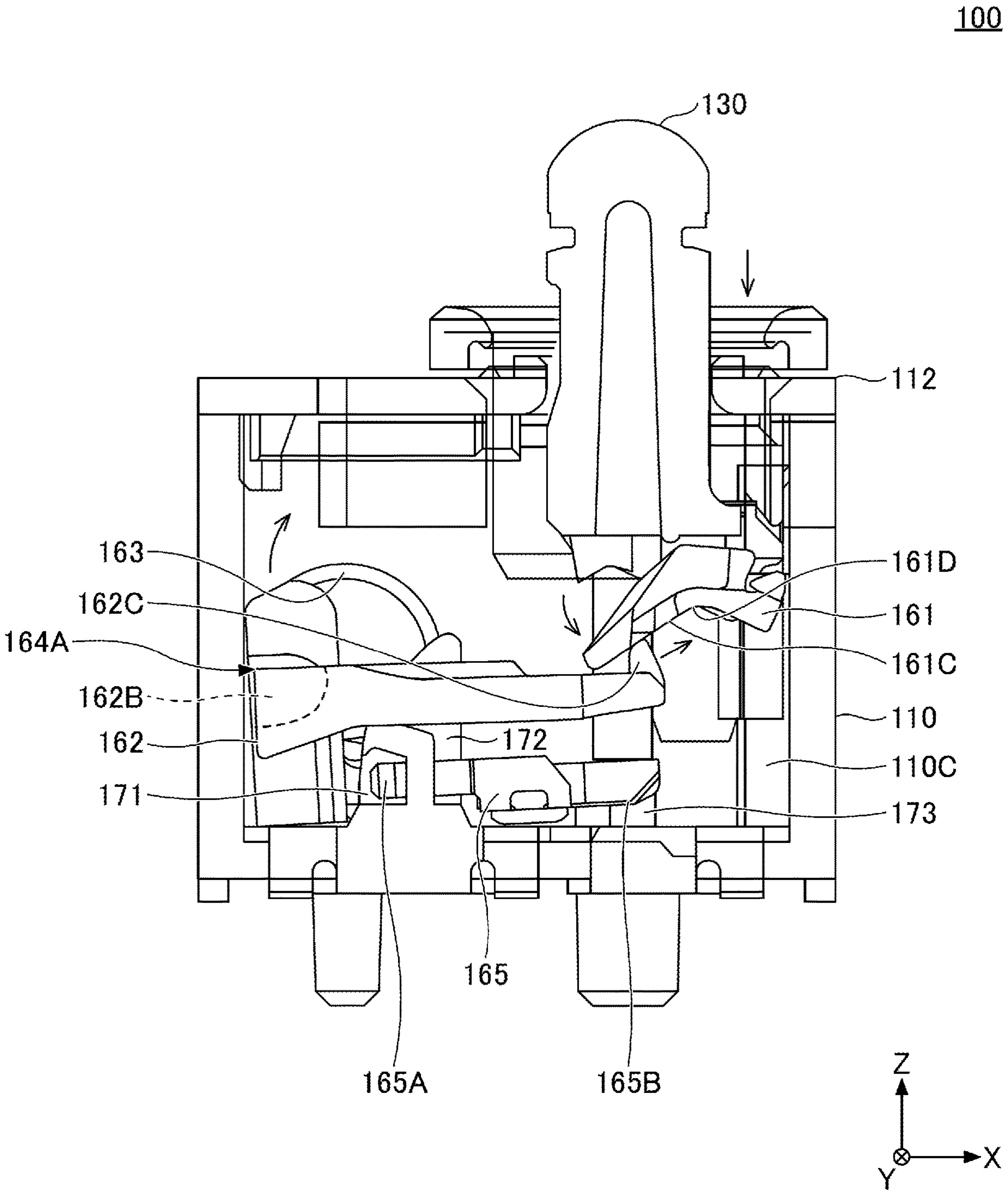
FIG. 15 is a diagram illustrating an operation of a selecting switch according to an embodiment.

As illustrated in FIG. 15, when the first actuator 161 is rotated downward by a predetermined angle, the rotation of the first actuator 161 is restricted. At this time, the force on the cam protruding portion 162C of the cam 162 for sliding up on the lower inclined surface 161C of the first actuator 161 caused by the biasing force from the torsion spring 163 exceeds friction resistance between the cam protruding portion 162C and the lower inclined surface 161C, and, thus, the cam protruding portion 162C instantly slides up on the lower inclined surface 161C toward a top 161D of the lower inclined surface 161C, and the cam protruding portion 162C stops after entering the top 161D. In this case, the contact sound between the cam protruding portion 162C and the top 161D is suppressed because the top 161D is a gently curved surface.

<Fifth State>

Figure 16:
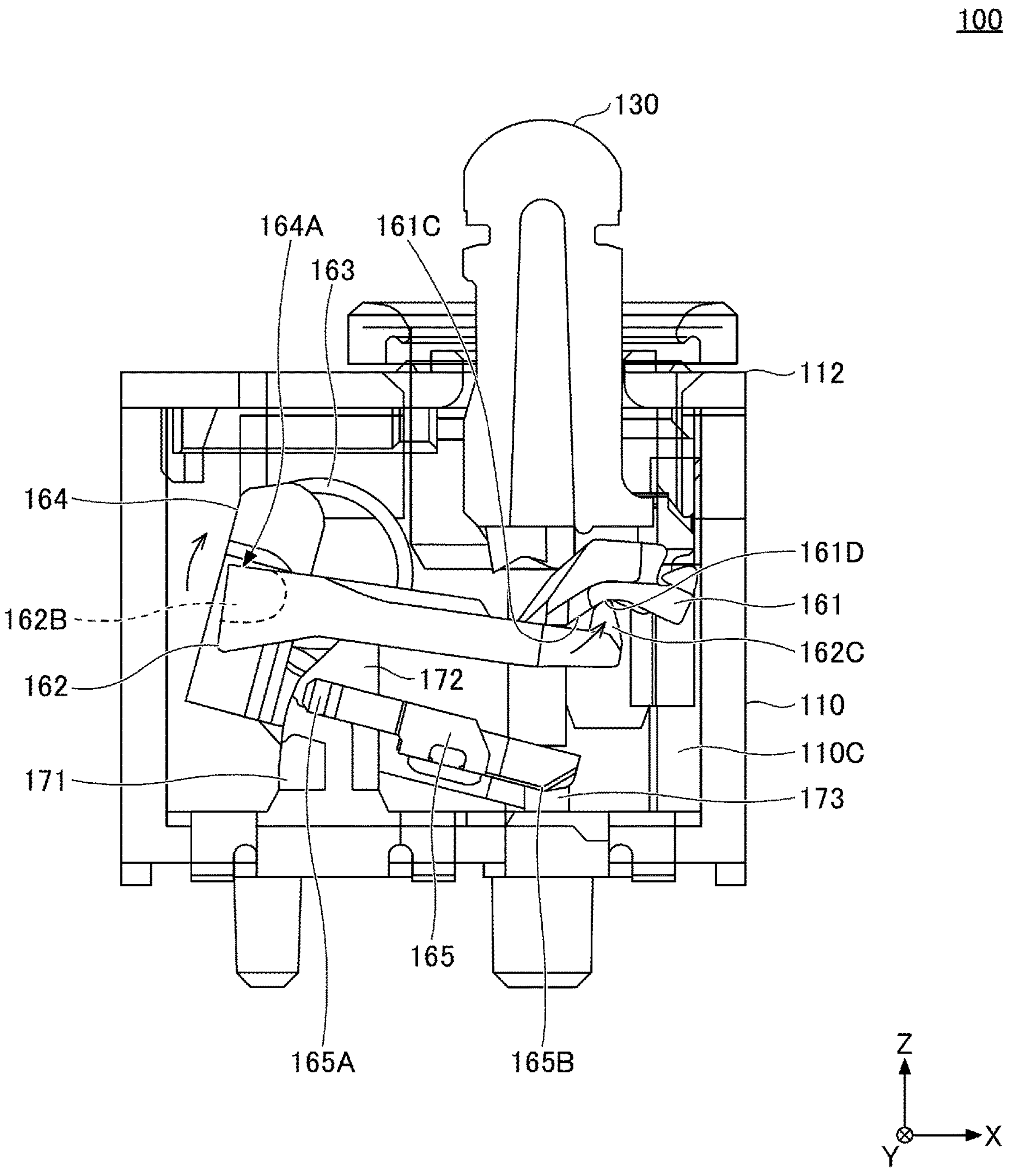
FIG. 16 is a diagram illustrating an operation of a selecting switch according to an embodiment.

As a result, as illustrated in FIG. 16, the rotating shaft portion 162B of the cam 162 instantly pulls the shaft support 164A of the second actuator 164 upward. At this time, the second actuator 164 rotates upward using the contact point between the second contact point 165B of the movable contact member 165 and the third fixed contact 173 held by the second actuator 164 (i.e., the folded part of the third fixed contact 173), as a fulcrum. Thus, the contact position of the first contact point 165A of the movable contact member 165 held by the second actuator 164 switches instantaneously from the first fixed contact 171 to the second fixed contact 172. As a result, the second fixed contact 172 and the third fixed contact 173 conduct each other through the movable contact member 165, that is, the conducting state of the selecting switch 100 switches to the second conducting state. As described above, by using the selecting switch 100, instantaneous switching operation by a snap action can be made.

<Sixth State>

Figure 17:
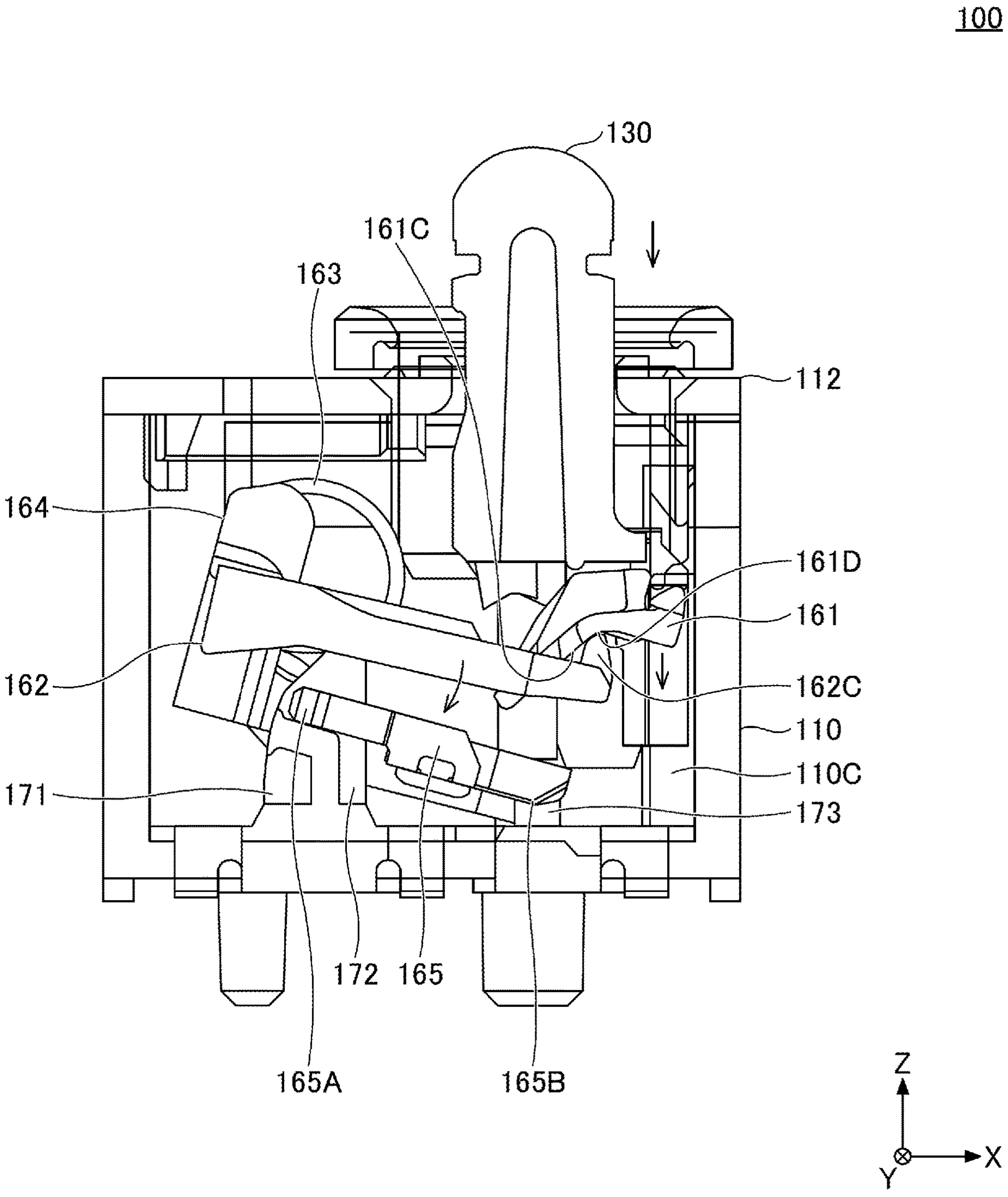
FIG. 17 is a diagram illustrating an operation of a selecting switch according to an embodiment.

Furthermore, as illustrated in FIG. 17, when the slider 130 is pushed further downward by an over-stroke that further pushes down the slider 130 after the switching operation, the first actuator 161 slides downward with the slider 130 and the first actuator 161 pushes down the cam protruding portion 162C of the cam 162 while keeping the rotation angle fixed. At this time, the slide of the first actuator 161 is guided by the guide rib 110C provided on the inner wall surface at the positive side of the case 110 in the X-axis direction. Furthermore, at this time, the first actuator 161 is gradually separated from the first shaft portion 112C of the lid 112, which was the center of rotation, in a downward direction.

<Seventh State>

Figure 18:
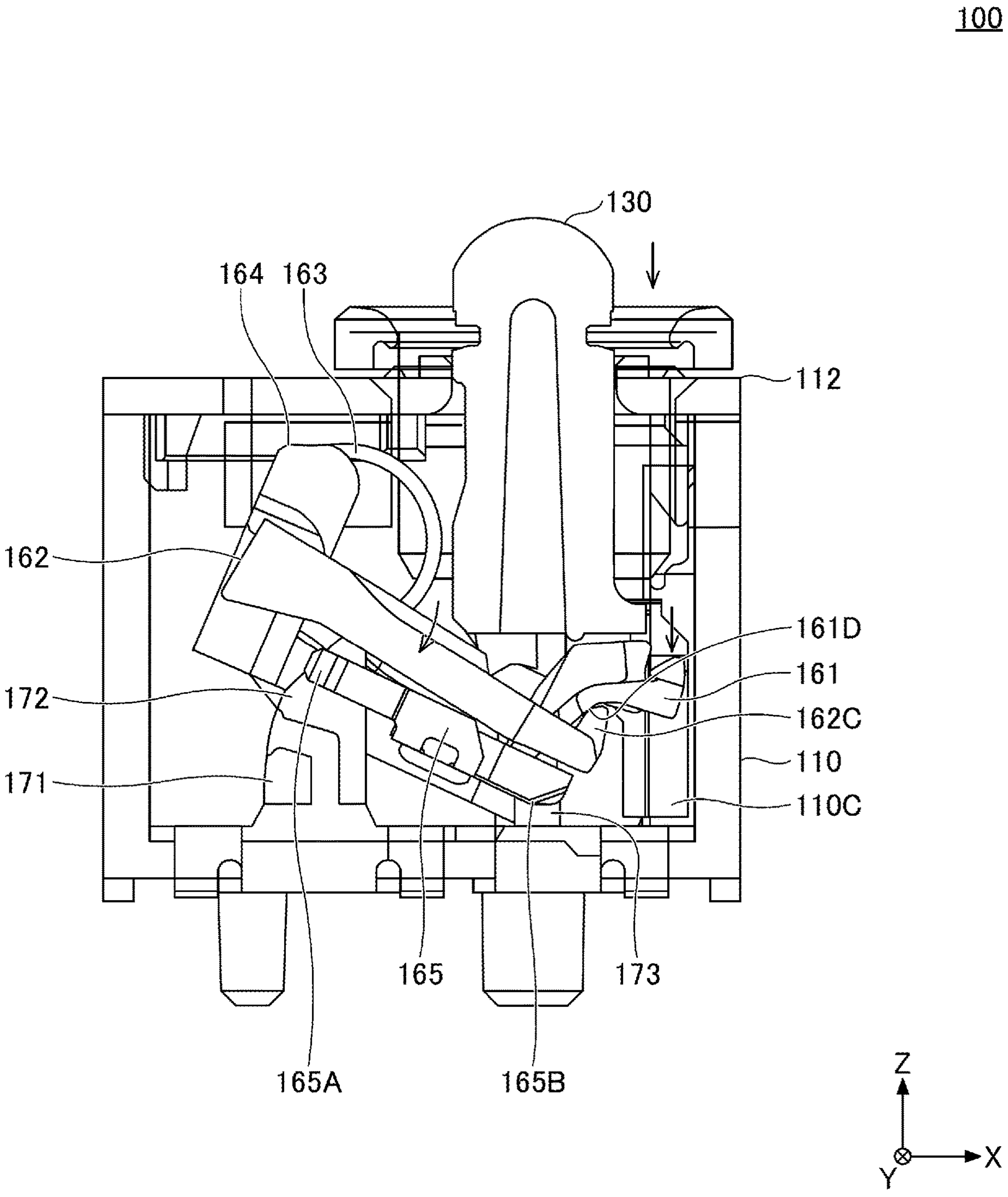
FIG. 18 is a diagram illustrating an operation of a selecting switch according to an embodiment.

Subsequently, as illustrated in FIG. 18, when the slider 130 is pushed down until a lower end 130E of the slider 130 illustrated in FIG. 5 contacts the bottom 110B of the case 110, the downward sliding of the slider 130 and the first actuator 161 stops. Namely, FIG. 18 represents a state in which the slider 130 is pushed down to the lower limit by the over-stroke of the slider 130.

Subsequently, when the pushing operation of the slider 130 is released, the slider 130 is pushed upward by the cam 162 and the first actuator 161 by the biasing force from the torsion spring 163, and the slider 130 returns to the initial position illustrated in FIG. 12.

<Eighth State>

Figure 19:
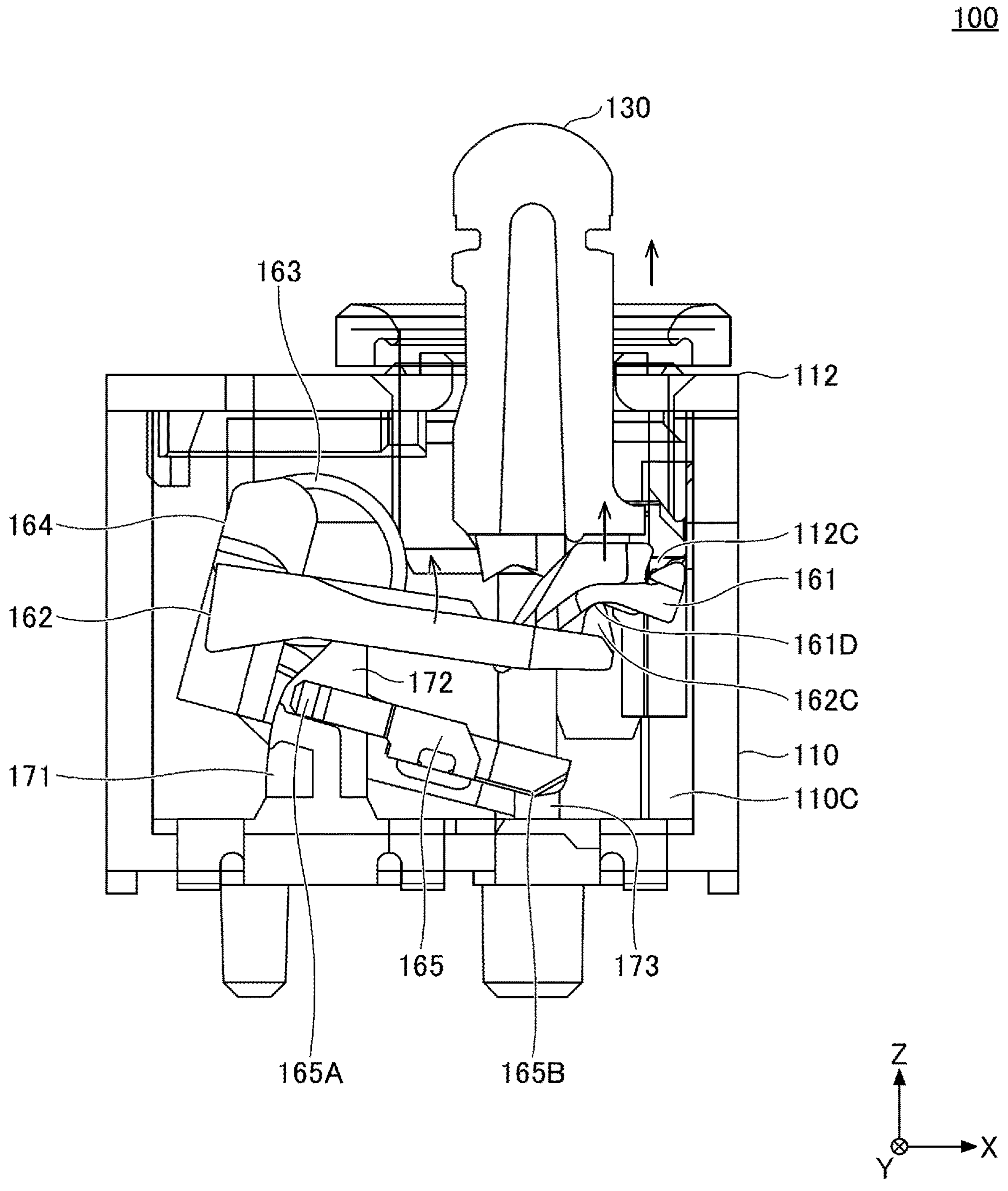
FIG. 19 is a diagram illustrating an operation of a selecting switch according to an embodiment.

Specifically, from the seventh state illustrated in FIG. 18, the cam protruding portion 162C of the cam 162 pushes the first actuator 161 upward by the biasing force from the torsion spring 163, as illustrated in FIG. 19. As a result, the first actuator 161 slides upward and pushes up the slider 130, while keeping the rotation angle fixed. At this time, the slide of the first actuator 161 is guided by the guide rib 110C provided on the inner wall surface at the positive side of the case 110 in the X-axis direction. Subsequently, as illustrated in FIG. 19, when the first actuator 161 contacts the first shaft portion 112C of the lid 112, the upward sliding of the first actuator 161 stops.

<Ninth State>

Figure 20A:
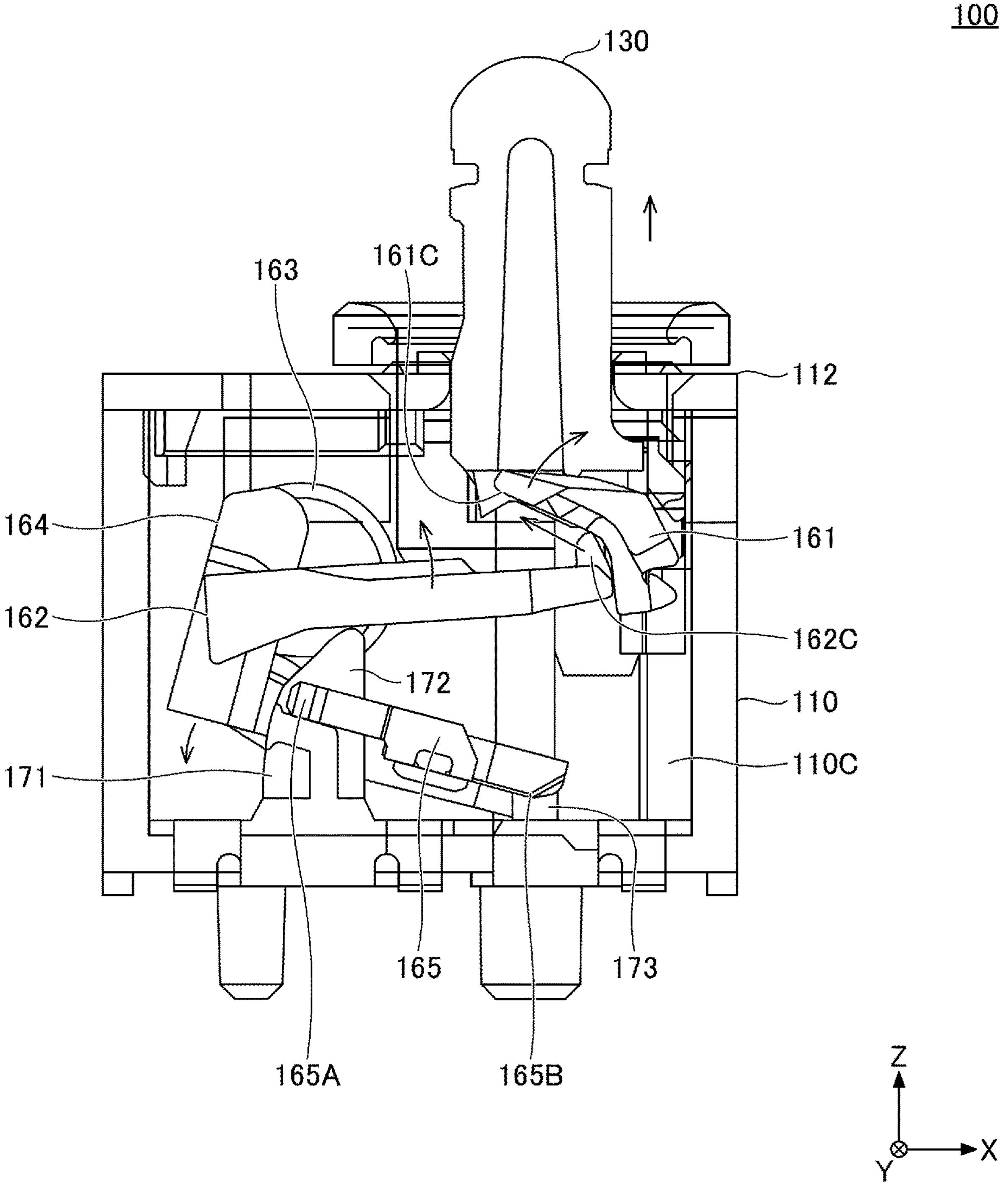
FIG. 20A is a diagram illustrating an operation of a selecting switch according to an embodiment.
Figure 20B:
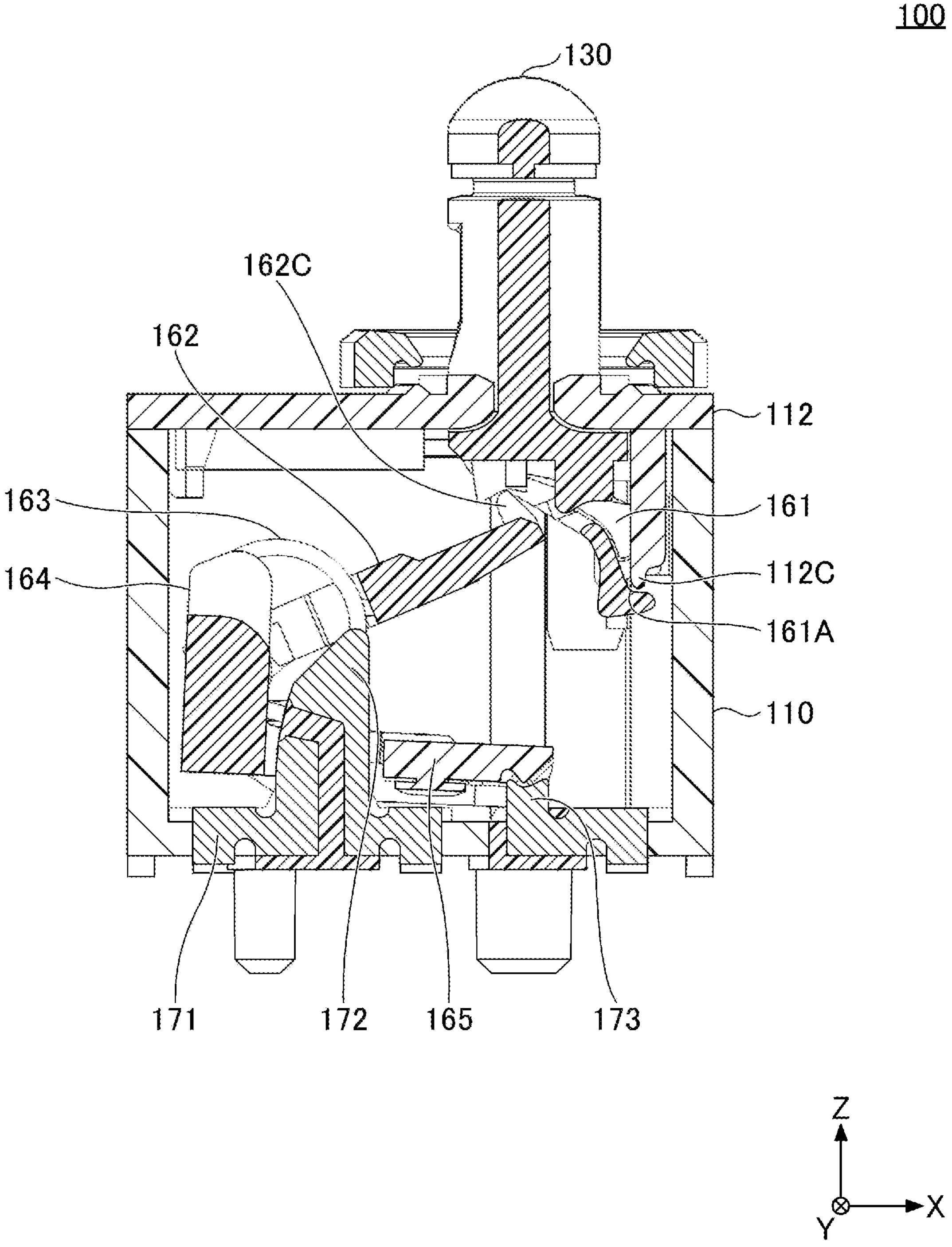
FIG. 20B is a diagram illustrating a state in which a first actuator is rotatably supported by a first shaft of a lid.

Subsequently, as illustrated in FIG. 20A, when the first actuator 161 is pushed up by the cam protruding portion 162C of the cam 162, the first actuator 161 rotates upward while being supported by the first shaft portion 112C of the lid 112, and the first actuator pushes up the slider 130. Note that, FIG. 20B illustrates a state in which the first actuator 161 is rotatably supported by the first shaft portion 112C of the lid 112. Subsequently, upon the force on the cam protruding portion 162C of the cam 162 for sliding up on the lower inclined surface 161C of the first actuator 161 caused by the biasing force from the torsion spring 163 exceeding the friction resistance between the cam protruding portion 162C and the lower inclined surface 161C, the cam protruding portion 162C instantly slides up on the lower inclined surface 161C toward the tip of the first actuator 161. As a result, the lifting of the shaft support 164A of the second actuator 164 by the rotating shaft portion 162B of the cam 162 is released. Namely, the second actuator 164 is instantaneously rotated downward with the contact point between the second contact point 165B of the movable contact member 165 and the third fixed contact 173 as the center of rotation.

<Tenth State>

Figure 21:
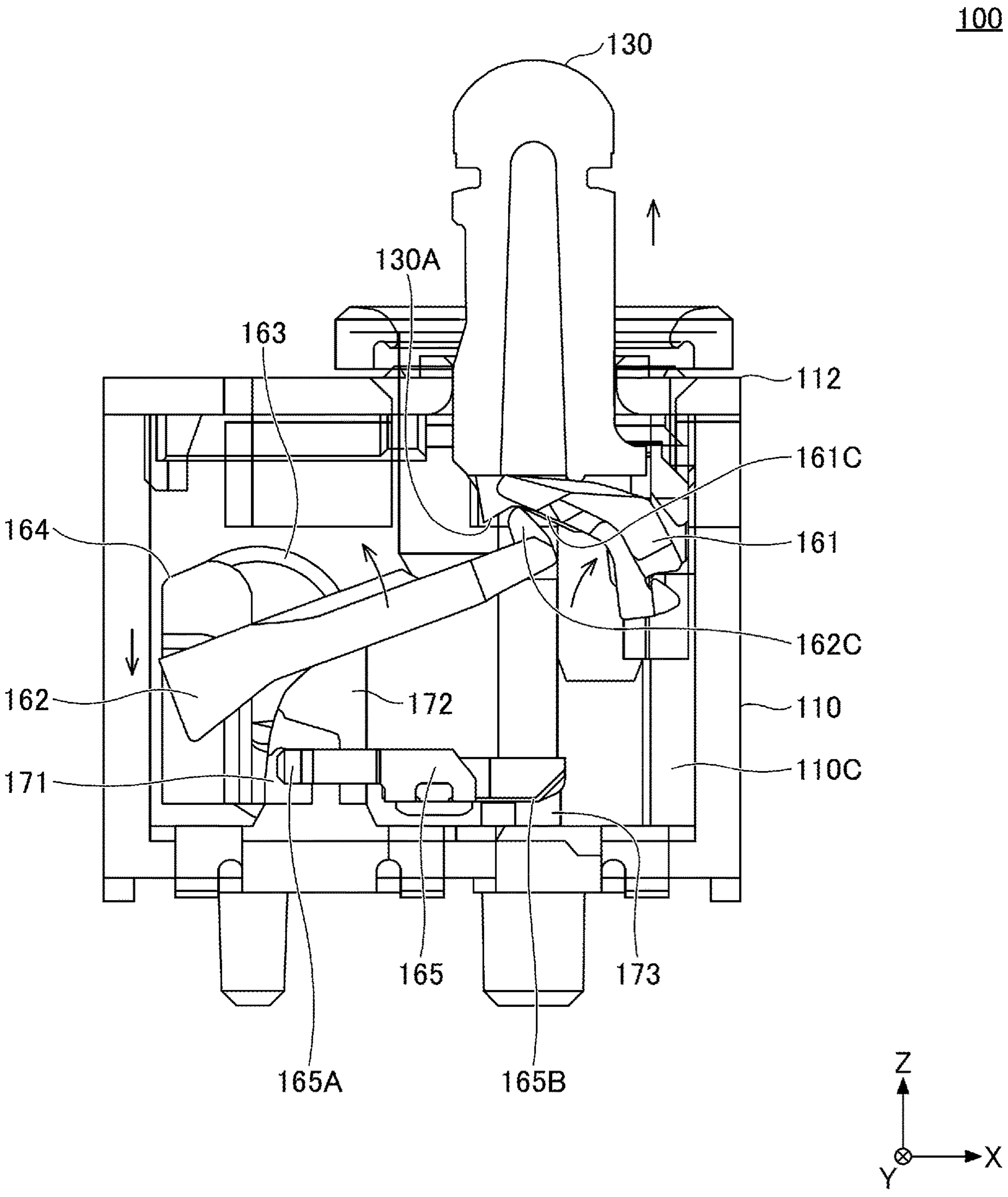
FIG. 21 is a diagram illustrating an operation of a selecting switch according to an embodiment.

Subsequently, as illustrated in FIG. 21, when the second actuator 164 is instantaneously rotated downward, the contact position of the first contact point 165A of the movable contact member 165 held by the second actuator 164 switches instantaneously from the second fixed contact 172 to the first fixed contact 171. As a result, the first fixed contact 171 and the third fixed contact 173 conduct each other through the movable contact member 165, i.e., the conducting state of the selecting switch 100 switches instantaneously to the first conducting state. As described above, by using the selecting switch 100, instantaneous switching operation by a snap action can be made. Furthermore, as illustrated in FIG. 21, when the contact position of the cam protruding portion 162C of the cam 162 switches from the lower inclined surface 161C of the first actuator 161 to the pressing surface 130A of the slider 130, the upward rotation of the first actuator 161 stops, and the cam protruding portion 162C of the cam 162 biases the pressing surface 130A of the slider 130 upward, and the cam protruding portion 162C of the cam 162 directly slides the slider 130 upward.

<Eleventh State>

Figure 22:
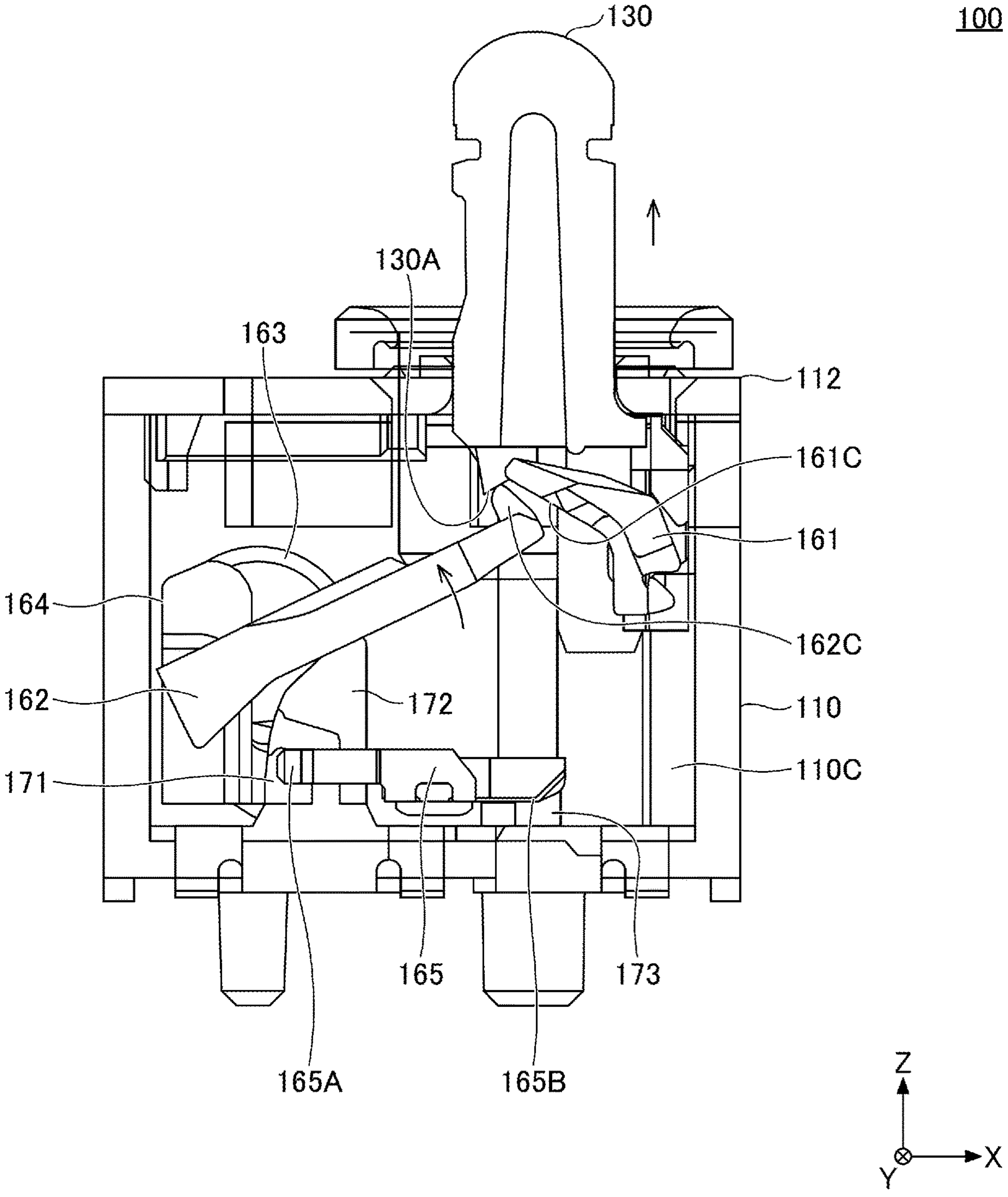
FIG. 22 is a diagram illustrating an operation of a selecting switch according to an embodiment.

As illustrated in FIG. 22, when the slider 130 contacts the lower surface of the lid 112, the upward sliding of the slider 130 stops. Namely, FIG. 22 represents the state in which the slider 130 is pushed up to the upper limit (the initial state).

(Rotatable Configuration of the First Actuator 161)

Next, a rotatable configuration of the first actuator 161 is described with reference to FIG. 23 through FIG. 30.

Figure 23:
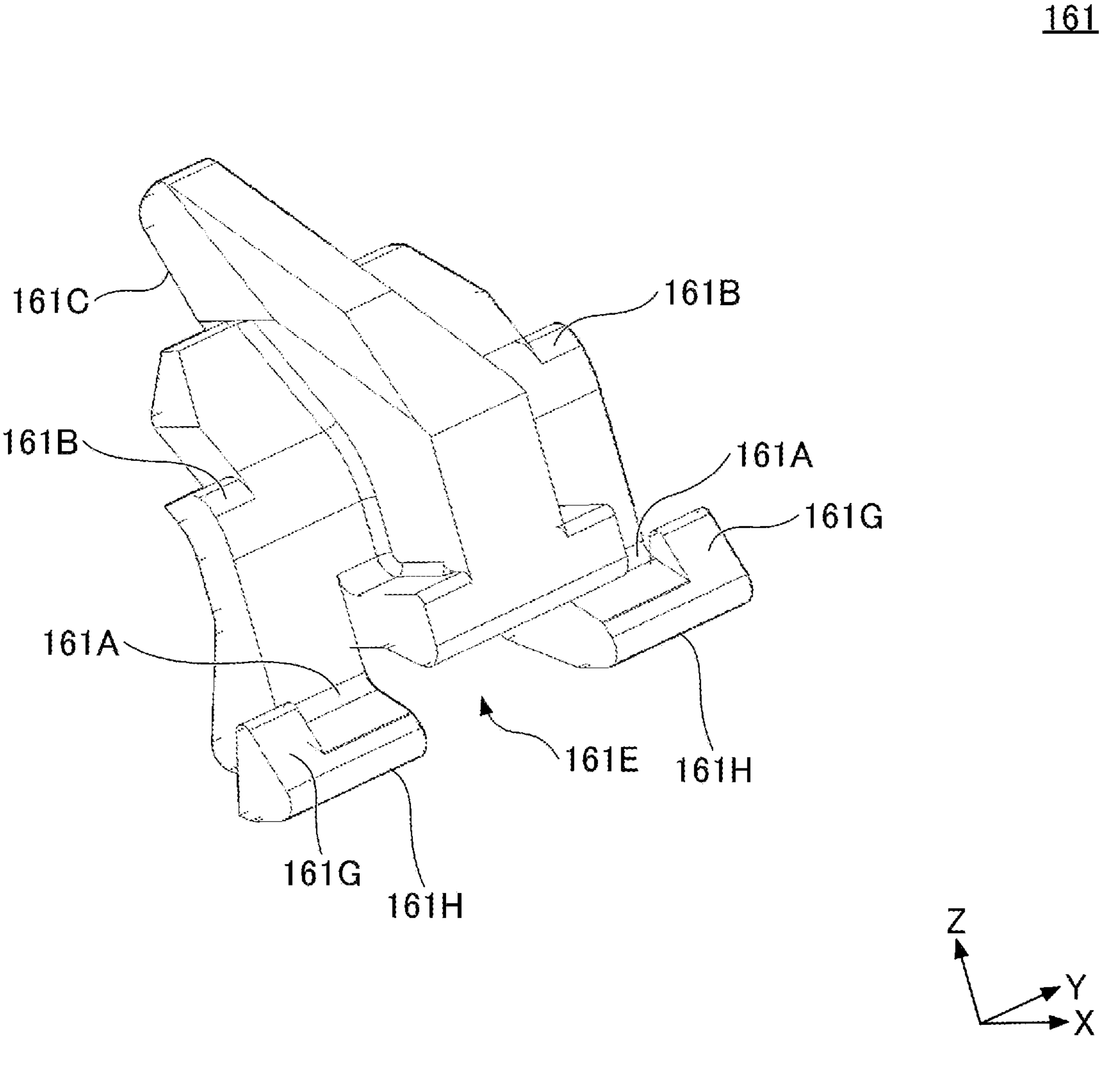
FIG. 23 is a perspective view of an external appearance of the first actuator as seen from above according to an embodiment.
Figure 24:
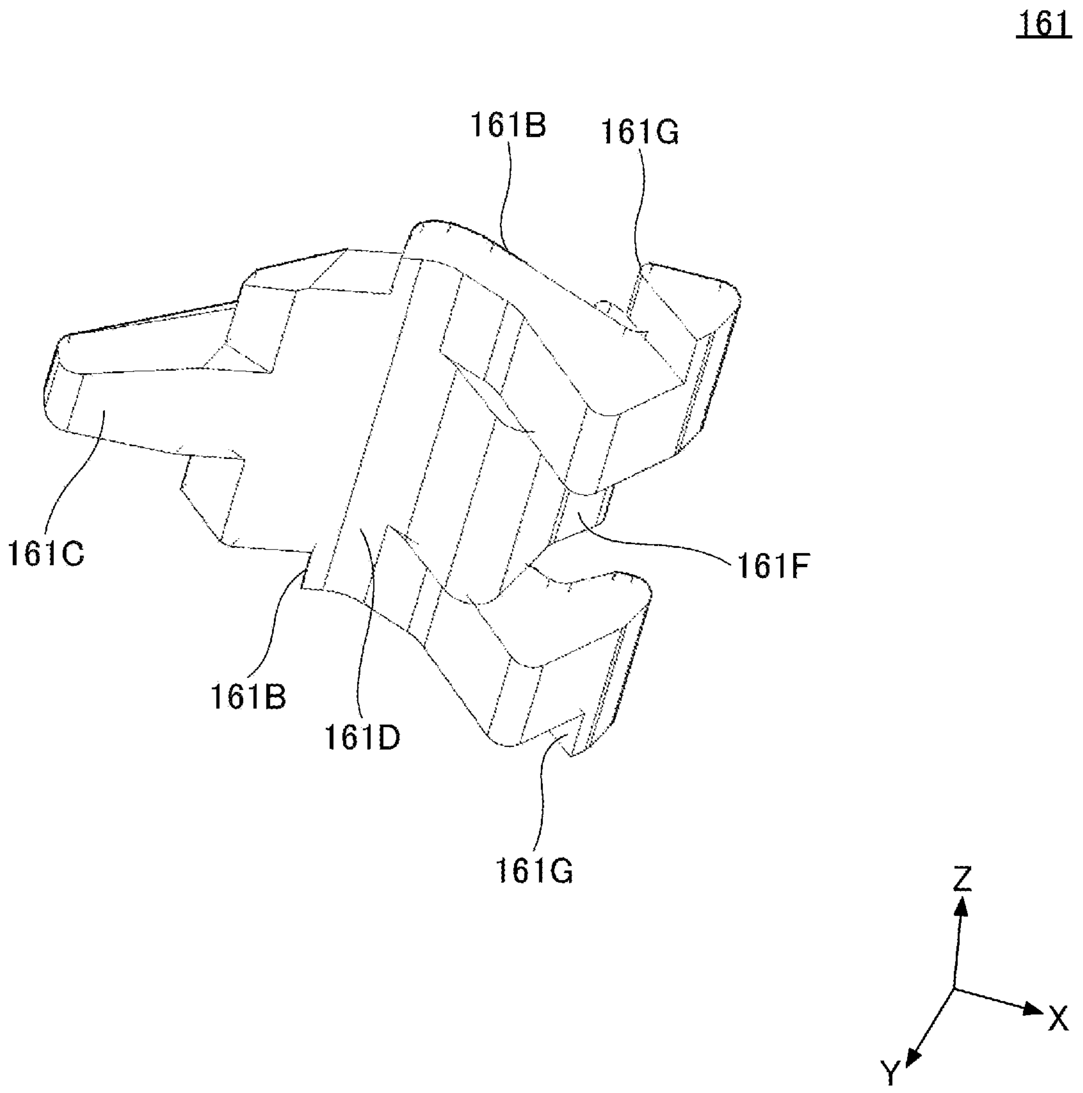
FIG. 24 is a perspective view of an external appearance of a first actuator as seen from below according to an embodiment.

FIG. 23 is a perspective view of an external appearance of the first actuator 161 according to an embodiment as viewed from above. FIG. 24 is a perspective view of an external appearance of the first actuator 161 according to an embodiment as viewed from below.

As illustrated in FIG. 23 and FIG. 24, the first actuator 161 has a tip shape protruding toward the cam 162 (the negative side in the X-axis direction) at the center in the left-right direction (the Y-axis direction) at the tip side. At each of step portions on both sides in the left-right direction (the Y-axis direction) of the first actuator 161, the upper contact surface 161B is formed. The upper contact surface 161B is to be pushed down by the slider 130. On the lower side of the center of the tip side of the first actuator 161, a lower inclined surface 161C is formed. The lower inclined surface 161C is to push down the cam 162.

In addition, as illustrated in FIG. 23 and FIG. 24, the first actuator 161 has a guide groove 161E at the center in the left-right direction (the Y-axis direction) of the rear end (the end at the positive side in the X-axis direction). The guide groove 161E is notched with a constant width along the front-back direction (the X-axis direction). Thus, the rear end of the first actuator 161 has a shape having a pair of left and right leg portions 161H. The guide groove 161E is disposed between the left and right leg portions 161H.

As illustrated in FIG. 23, each of the pair of leg portions 161H of the first actuator 161 is provided with the curved upper bearing surface 161A exposed upward.

Furthermore, as illustrated in FIG. 24, the first actuator 161 has the curved lower bearing surface 161F exposed downward (i.e., exposed to the guide groove 161E) at the rear end of the center in the left-right direction (the Y-axis direction).

Figure 25:
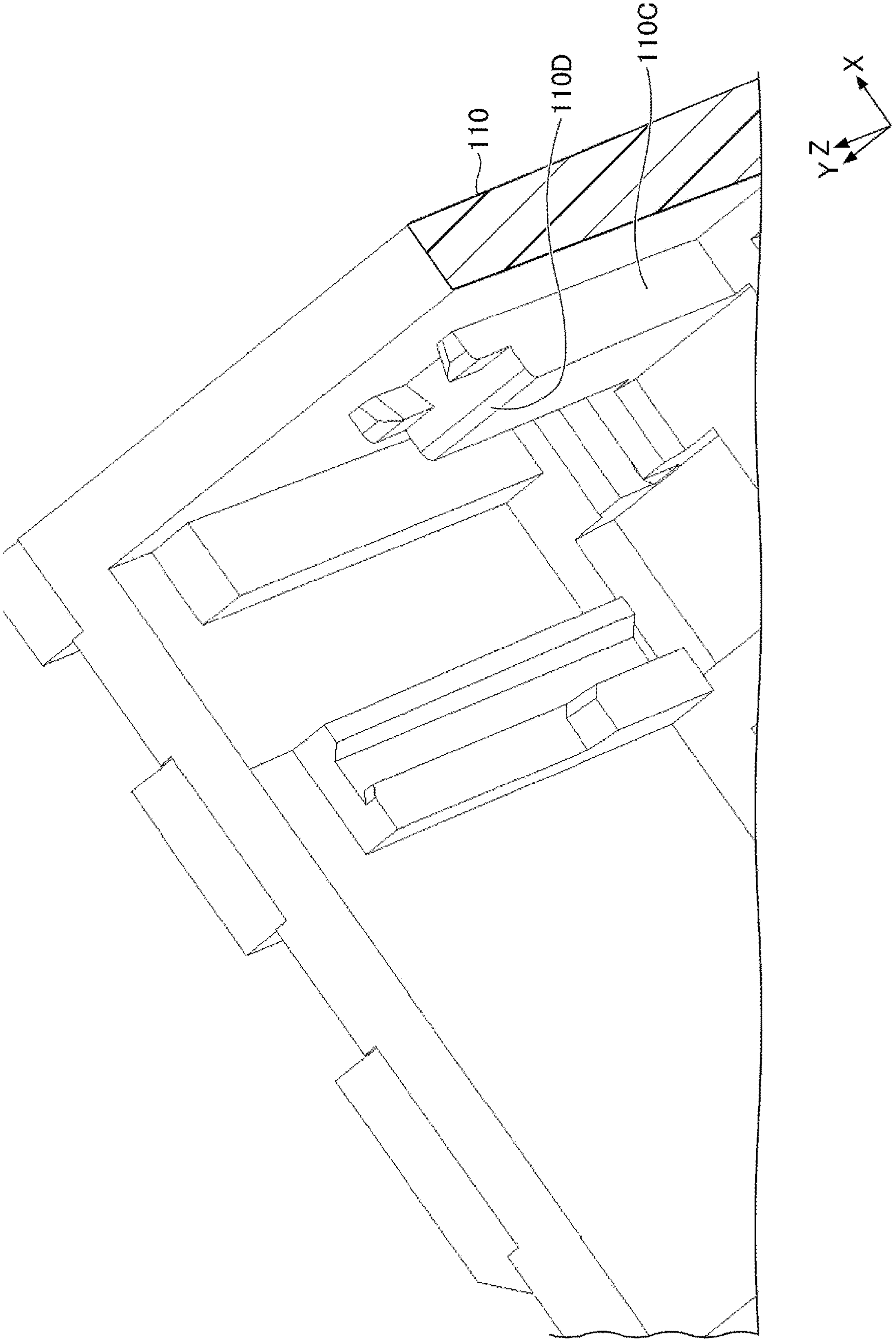
FIG. 25 is a perspective cross-sectional view of a case (in a state in which a first actuator is not disposed) as seen from above according to an embodiment.
Figure 26:
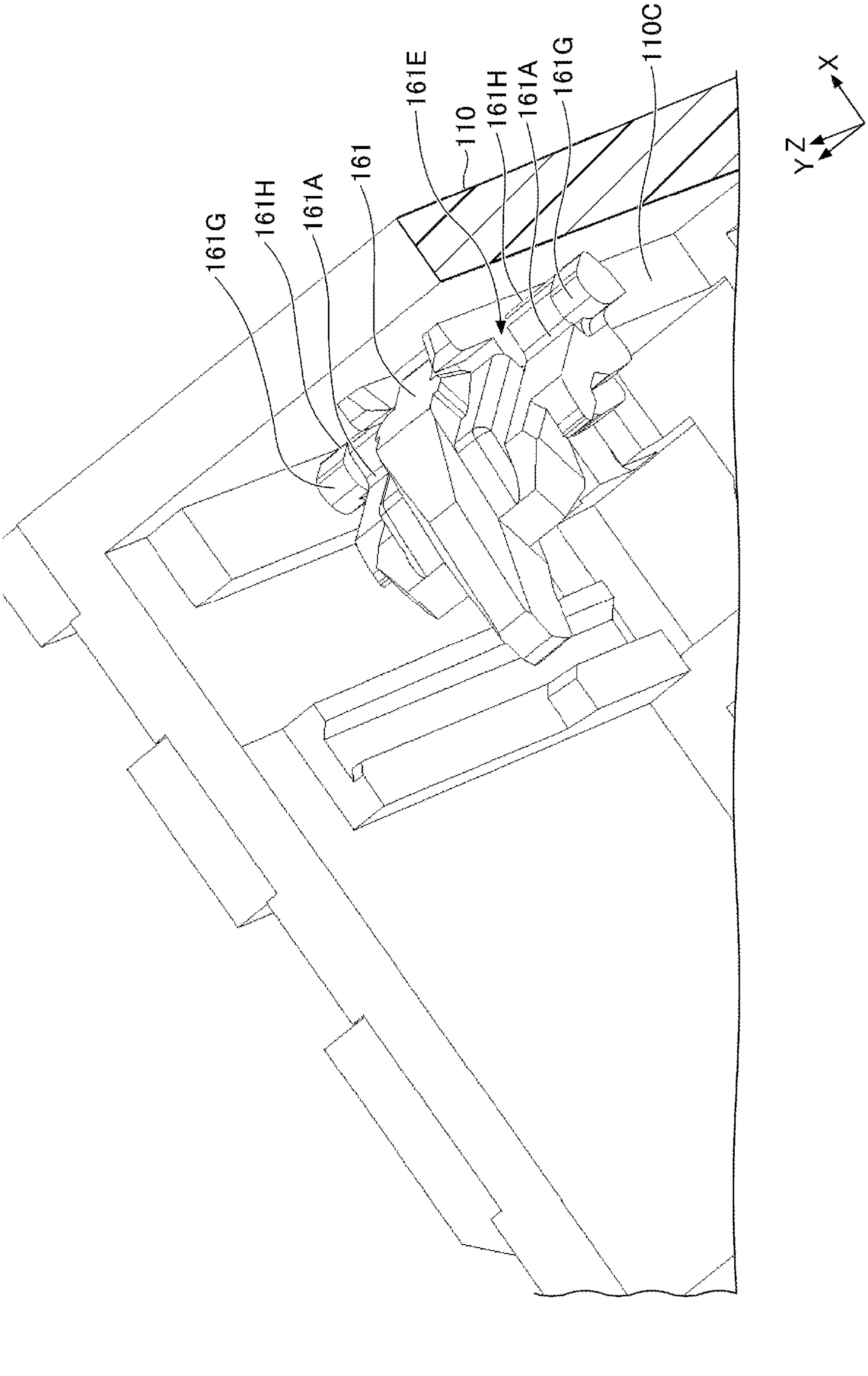
FIG. 26 is a perspective cross-sectional view of a case (in a state in which a first actuator is disposed) as seen from above according to an embodiment.

FIG. 25 is a perspective cross-sectional view of the case 110 (without the first actuator 161) according to an embodiment as viewed from above. FIG. 26 is a perspective cross-sectional view of the case 110 (with the first actuator 161 placed) according to an embodiment as viewed from above.

Figure 27:
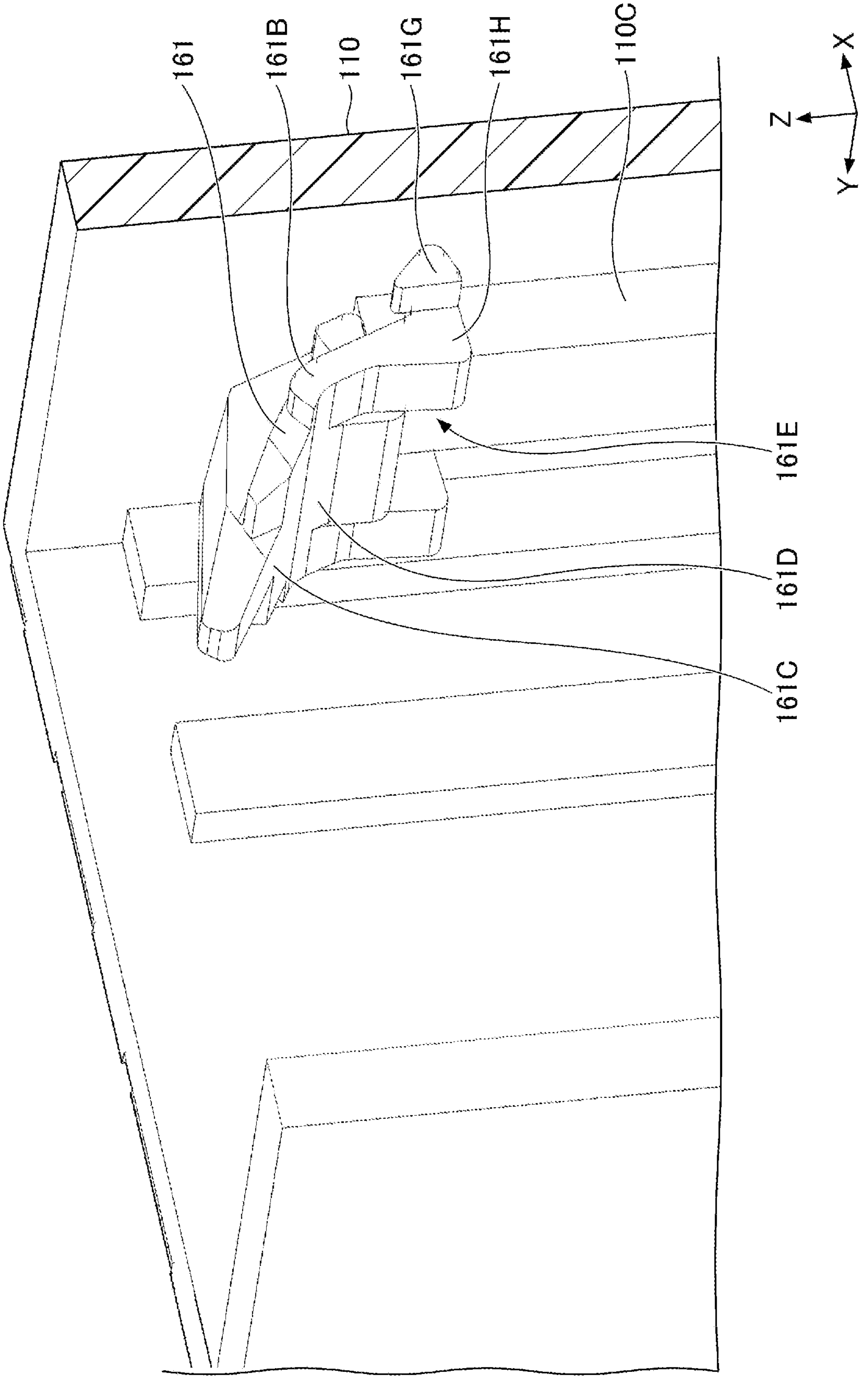
FIG. 27 is a cross-sectional view of a case (in a state in which a first actuator is disposed) as laterally viewed according to an embodiment.
Figure 28:
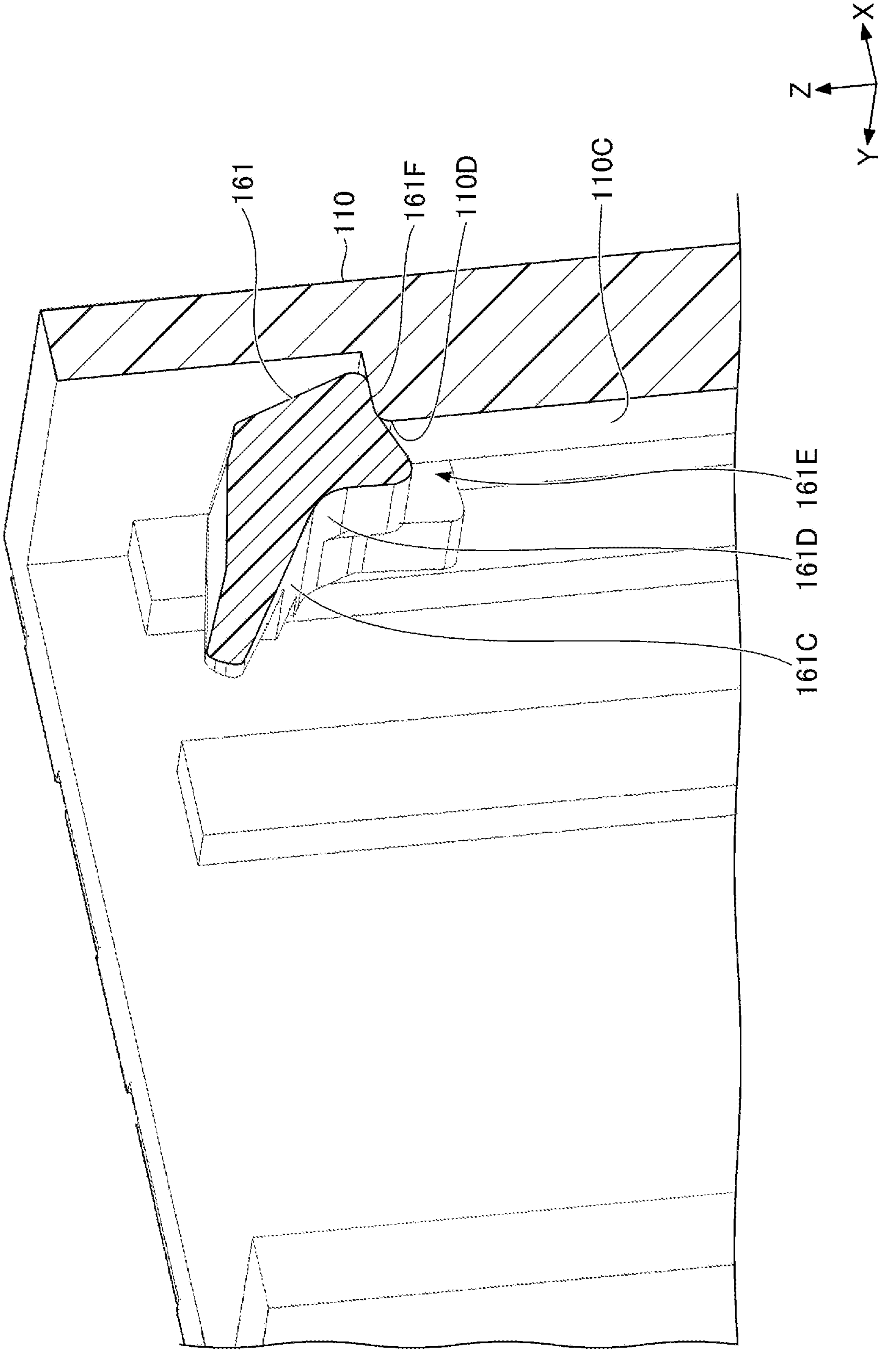
FIG. 28 is a cross-sectional view of a case (in a state in which a first actuator is disposed) as laterally viewed according to an embodiment.

FIG. 27 and FIG. 28 are perspective cross-sectional view of the case 110 (with the first actuator 161 placed) according to an embodiment as laterally viewed. FIG. 27 represents a cross section in which only the case 110 is cut. FIG. 28 represents a cross section in which the center of the first actuator 161 in the left-right direction is cut.

Figure 29:
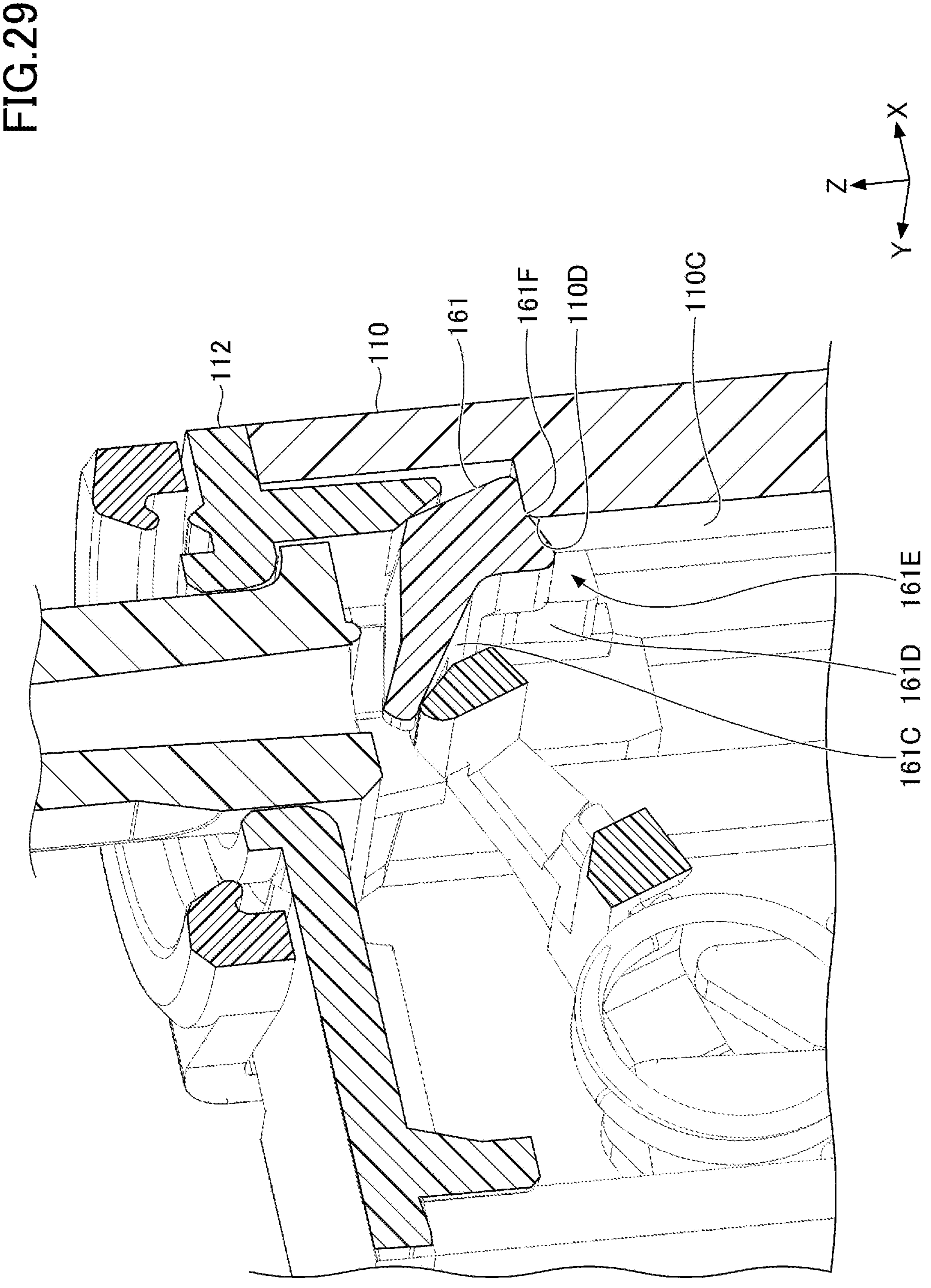
FIG. 29 is a cross-sectional view of a selecting switch as laterally viewed according to an embodiment.
Figure 30:
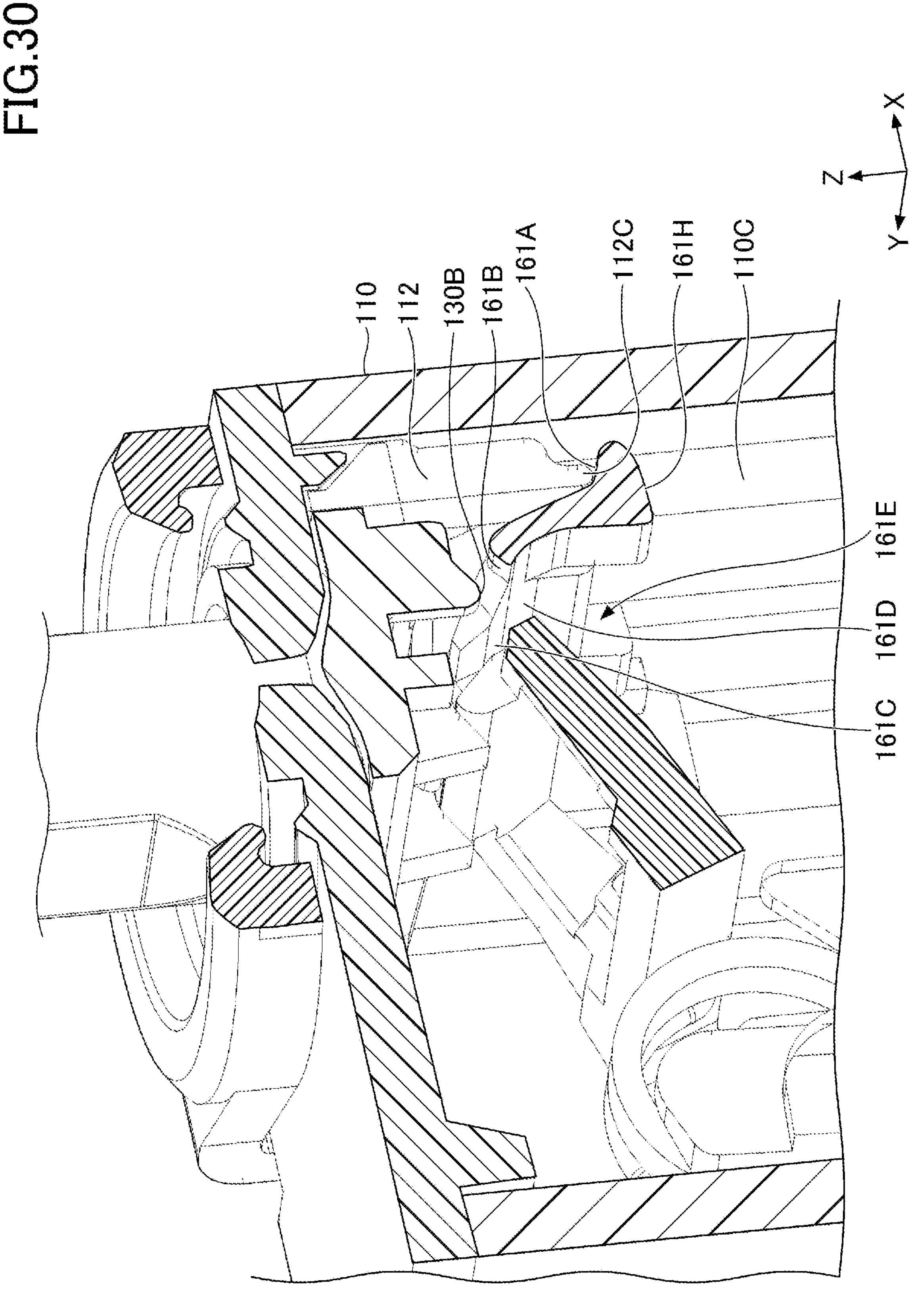
FIG. 30 is a cross-sectional view of a selecting switch as laterally viewed according to an embodiment.

FIG. 29 and FIG. 30 are perspective cross-sectional view of the selecting switch 100 according to an embodiment as laterally viewed. FIG. 29 represents a cross section in which the center of the first actuator 161 in the left-right direction is cut. FIG. 30 represents a cross section in which the left leg portion 161H of the first actuator 161 is cut.

As illustrated in FIG. 25 through FIG. 27, the first actuator 161 is arranged so that the guide rib 110C formed on the inner wall surface of the case 110 at the positive side in the X-axis direction is clumped from the left and right sides by the pair of leg portions 161H (i.e., the guide rib 110C is to be fitted into the guide groove 161E). The width of the guide groove 161E is approximately the same as the width of the guide rib 110C formed on the inner wall surface of the case 110 at the positive side in the X-axis direction. Thus, the first actuator 161 can slide vertically (in the Z-axis direction) along the guide rib 110C while rattle in the left-right direction (in the Y-axis direction) is suppressed by the guide rib 110C during the over-stroke of the slider 130.

Furthermore, as illustrated in FIG. 26 through FIG. 29, the lower bearing surface 161F of the first actuator 161 bears the second shaft portion 110D by riding on the second shaft portion 110D formed at the upper corner of the guide rib 110C when the first actuator 161 is placed at the upper end of the guide rib 110C.

Furthermore, as illustrated in FIG. 30, the upper bearing surface 161A of the first actuator 161 bears the first shaft portion 112C by abutting the first shaft portion 112C famed at the lower end of the shaft support 112B (see FIG. 4) that is formed to hang downward from the lower surface of the lid 112.

That is, in the first actuator 161, the upper bearing surface 161A is supported from the upper side by the first shaft portion 112C, and the lower bearing surface 161F is supported from the lower side by the second shaft portion 110D. As a result, the first actuator 161 is rotatably arranged with the upper bearing surface 161A and the lower bearing surface 161F as the center of rotation with respect to the inner wall surface of the case 110 at the positive side in the X-axis direction.

(Relationship Between the First Actuator 161 and the Slider 130)

Figure 31:
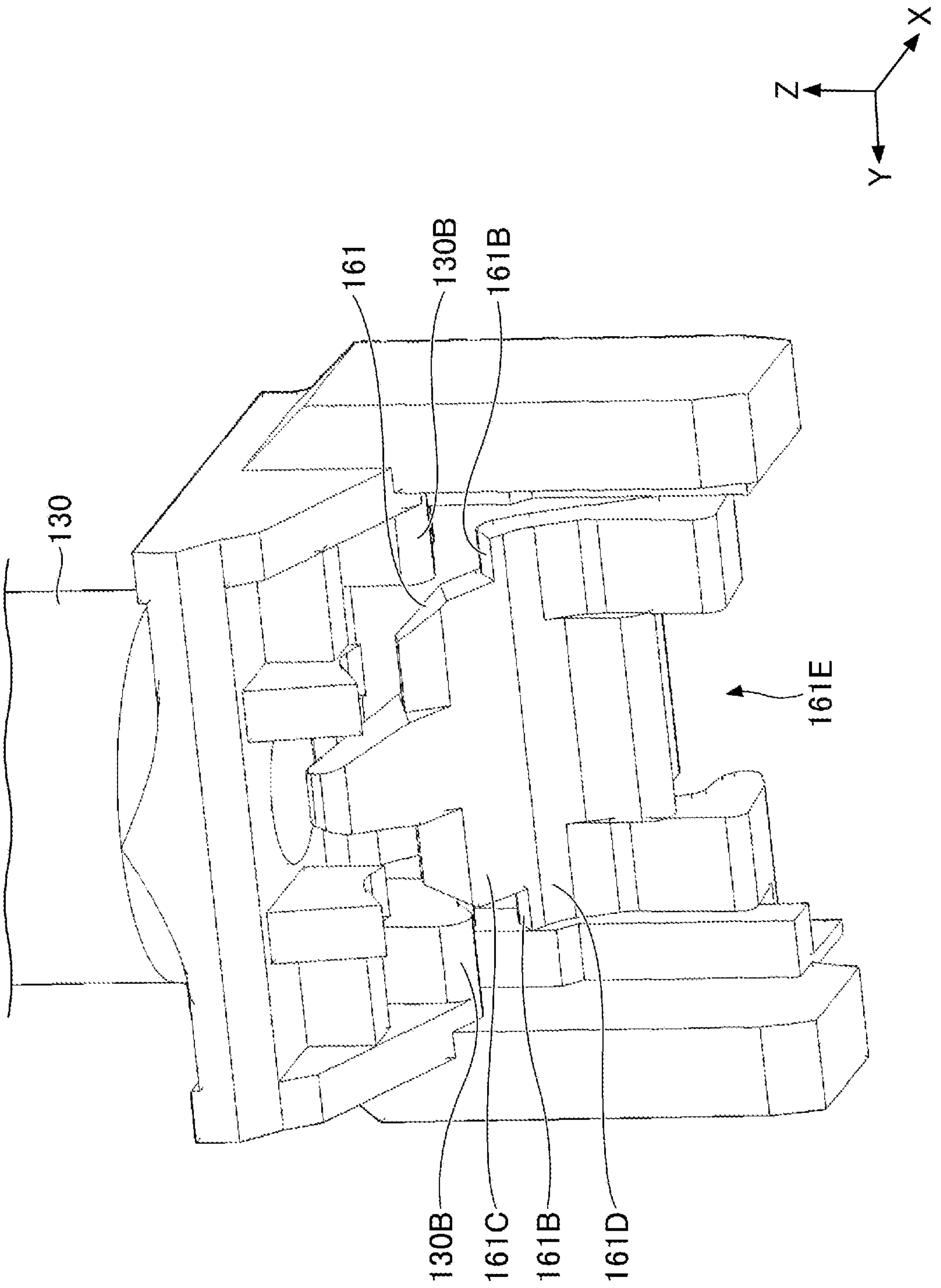
FIG. 31 is a perspective view of an external appearance of a first actuator and a slider according to an embodiment.
Figure 32:
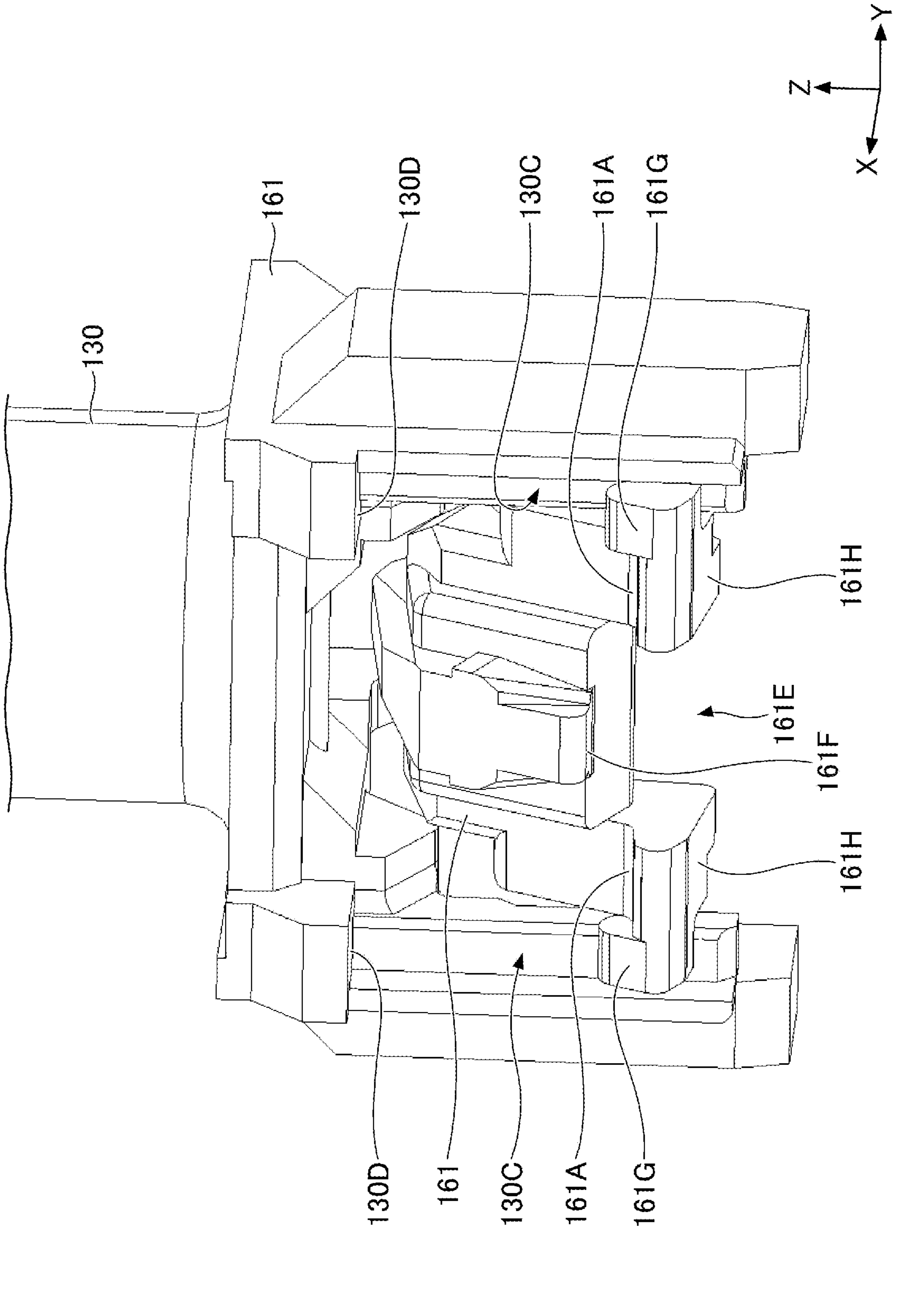
FIG. 32 is a perspective view of an external appearance of a first actuator and a slider according to an embodiment.

FIG. 31 and FIG. 32 are perspective views of the external appearance of the first actuator 161 and the slider 130 according to an embodiment.

As illustrated in FIG. 32, the first actuator 161 has an axial outwardly projecting overhanging portion 161G on each of the pair of leg portions 161H. The overhanging portion 161G is arranged in a vertically extending slide groove 130C formed in the slider 130. The overhanging portion 161G moves vertically in the slide groove 130C while rotating in accordance with the vertical sliding of the slider 130 and the rotation of the first actuator 161.

The overhanging portion 161G restricts further rotation of the first actuator 161 by abutting on an upper end surface 130D of the slide groove 130C when the slider 130 is pressed by a predetermined amount and the first actuator 161 is rotated by a predetermined angle.

In this state, the lower bearing surface 161F of the first actuator 161 is released from riding on the second shaft portion 110D formed at the upper corner of the guide rib 110C. Accordingly, the first actuator 161 can slide downward. Accordingly, when the slider 130 is further pressed by the over-stroke of the slider 130, the first actuator 161 slides downward along the guide rib 110C with the slider 130.

As described above, the selecting switch 100 according to an embodiment includes a case 110; a slider 130 that slides in a vertical direction by being pushed down; a first actuator 161 that rotates downward by being pushed down by the slider 130; a second actuator 164 that holds a movable contact member 165; a first fixed contact 171 and a second fixed contact 172 to be contacted by the movable contact member 165; a cam protruding portion 162C that is rotatably born by the second actuator 164 and that contacts the lower inclined surface 161C of the first actuator; a cam 162 that rotates downward upon the cam protruding portion 162C being pushed down while sliding on the lower inclined surface 161C; and a torsion spring 163 that biases the cam 162 upward, wherein, upon the first actuator 161 being rotated downward by a predetermined angle, the cam protruding portion 162C instantaneously slides up on the lower inclined surface 161C by the biasing force from the torsion spring 163, and the cam 162 pulls up the second actuator 164 so that a contact of the movable contact member 165 is instantaneously switched from the first fixed contact 171 to the second fixed contact 172.

As described above, the selecting switch 100 according to an embodiment uses the torsion spring 163 to bias the slider 130 in the return direction, the size in the horizontal direction (in the X-axis direction and the Y-axis direction) can be reduced compared to the switch according to the related art that uses the coil spring to bias the slider in the return direction. Accordingly, with the selecting switch 100 according the embodiment, further reduction in the size of the selecting switch can be achieved.

Furthermore, in the selecting switch 100 according to an embodiment, upon being pulled up by the cam 162, the second actuator 164 instantaneously switches the contact of the movable contact member 165 from the first fixed contact 171 to the second fixed contact 172 while keeping the movable contact member 165 in contact with the third fixed contact 173 by rotating upward with the contact position between the movable contact member 165 and the third fixed contact 173 as a fulcrum.

Accordingly, the selecting switch 100 according to an embodiment uses the contact position between the movable contact member 165 and the third fixed contact 173 as a fulcrum, so that there is no need to provide a separate fulcrum for rotating the second actuator 164, and, thus, the configuration for rotating the second actuator 164 can be made relatively simple.

Furthermore, in the selecting switch 100 according to an embodiment, the second actuator 164 has a shaft support 164A that supports the rotating shaft portion 162B of the cam 162, and the cam 162 switches the contact of the movable contact member 165 from the first fixed contact 171 to the second fixed contact 172 by pulling up the shaft support 164A of the second actuator 164 by the rotating shaft portion 162B.

As described above, in the selecting switch 100 according to an embodiment, the fact that the cam 162 is rotatably connected to the second actuator 164 can be used to rotate the second actuator 164 upward by using the connected portion, so that the configuration relating to the rotation of the second actuator 164 can be made relatively simple.

Furthermore, in the selecting switch 100 according to an embodiment, the second actuator 164 is pressed against the inner bottom of the case 110 by the biasing force from the torsion spring 163.

As described above, in the selecting switch 100 according to an embodiment, the slider 130 can be biased in the return direction and the second actuator 164 can be pressed against the inner bottom of the case 110 by a relatively simple configuration using one torsion spring 163.

Furthermore, in the selecting switch 100 according to an embodiment, upon the slider 130 being moved downward to a predetermined height position, the first actuator 161 is restricted from further downward rotation.

As a result, the selecting switch 100 according to an embodiment can prevent the downward over rotation of the first actuator 161.

Furthermore, in the selecting switch 100 according to an embodiment, the slider 130 has a slide groove in which the overhanging portion 161G of the first actuator 161 slides in the vertical direction, and, upon the slider being moved downward to a predetermined height position, the overhanging portion 161G contacts the upper end surface of the slide groove to restrict further downward rotation of the first actuator 161.

Accordingly, the selecting switch 100 according to an embodiment can ensure to prevent the downward over rotation of the first actuator 161 with a relatively simple configuration.

Furthermore, in the selecting switch 100 according to an embodiment, the first actuator 161 deviates from the rotating shaft upon the slider 130 being moved downward to a predetermined height position.

With this configuration, upon the slider 130 being further pushed downward, the selecting switch 100 according to an embodiment can further move the first actuator 161 downward beyond the center of rotation, and, thus, the slider 130 can further slide downward.

Furthermore, in the selecting switch 100 according to an embodiment, upon the slider 130 being further moved downward from a predetermined height position after the first actuator 161 deviates from the rotating shaft, the first actuator 161 slides downward with the slider 130 along the guide rib 110C formed on the inner wall surface of the case 110 while keeping the rotation angle fixed.

With this configuration, the selecting switch 100 according to an embodiment can achieve the over-stroke of the slider 130. In this case, the selecting switch 100 according to the embodiment can further push down the cam 162 by using the first actuator 161 sliding downward while keeping the rotation angle of the first actuator 161 fixed.

Furthermore, in the selecting switch 100 according to an embodiment, the guide rib 110C has a second shaft portion 110D at the upper end, and the first actuator 161 has a lower bearing surface 161F. Upon the lower bearing surface 161F riding on the second shaft portion 110D, the first actuator 161 can rotate around the second shaft portion 110D, and, upon the slider 130 being moved downward to a predetermined height position, the lower bearing surface 161F is dropped from the second shaft portion 110D, and, thus, the first actuator 161 deviates from the rotating shaft.

As described above, the selecting switch 100 according to an embodiment can deviate the first actuator 161 from the rotating shaft with a relatively simple configuration.

Furthermore, in the selecting switch 100 according to an embodiment, upon the slider 130 being returned upward to a predetermined height position, the upper bearing surface 161A of the first actuator 161 abuts against the first shaft portion 112C of the lid 112, and, upon the slider 130 being further returned upward from the predetermined height position, the first actuator 161 rotates while being born by the first shaft portion 112C. Accordingly, upon being pushed up by the cam protruding portion 162C of the cam 162, the first actuator 161 rotates upward around the first shaft portion 112C.

Accordingly, the selecting switch 100 according to an embodiment can return the first actuator 161 to a rotatable state with a relatively simple configuration.

Furthermore, in the selecting switch 100 according to an embodiment, upon the first actuator 161 being rotated upward to a predetermined height position with the first shaft portion 112C as the center of rotation, the cam 162 releases pulling up of the second actuator 164 as a result that the cam protruding portion 162C instantaneously slides up on the lower inclined surface 161C by the biasing force from the torsion spring 163, so that the contact of the movable contact member 165 is instantaneously switched from the second fixed contact 172 to the first fixed contact 171.

Although the embodiments of the present invention are described in detail above, the present invention is not limited to the embodiments, and various modifications and alterations can be made within the scope of the gist of the present invention as set forth in the claims.

First Modified Example

Figure 33:
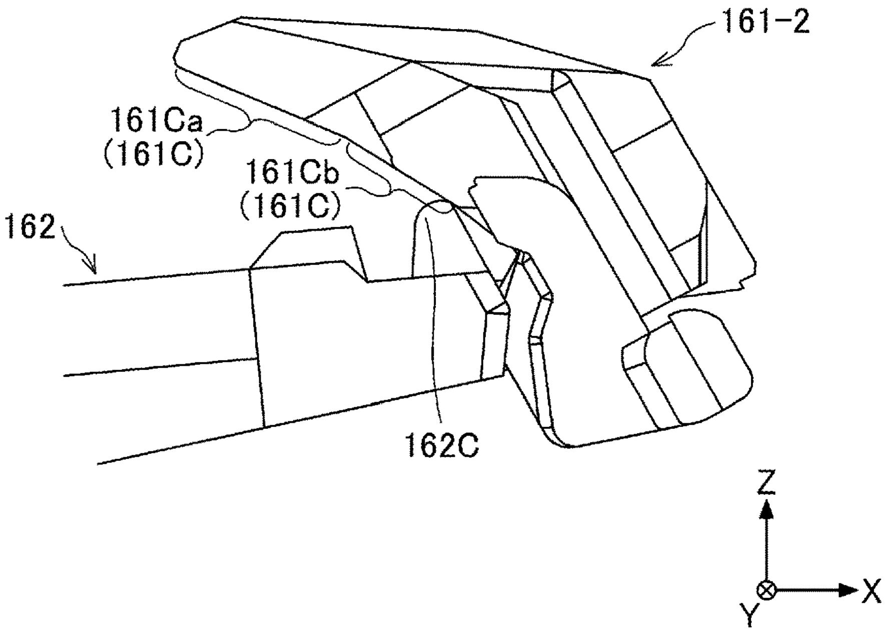
FIG. 33 is a side view of a first actuator according to a first modified example.

FIG. 33 is a side view of the first actuator 161-2 according to a first modified example. As illustrated in FIG. 33, in the first actuator 161-2 according to the first modified example, the shape of the lower inclined surface 161C differs from that of the first actuator 161, and the other configuration is the same as that of the first actuator 161.

The first actuator 161 has a planar shape with the lower inclined surface 161C having a constant inclination angle. In contrast, the first actuator 161-2 has a polyhedral shape in which the lower inclined surface 161C is connected with two inclined portions 161Ca and 161Cb whose inclination angles are different from each other.

Specifically, the lower inclined surface 161C of the first actuator 161-2 has the planar first inclined portion 161Ca on the tip side (the negative side in the X-axis direction) of the lower inclined surface 161C, and a planar second inclined portion 161Cb following the first inclined portion 161Ca on the rear end side (the positive side in the X-axis direction) of the lower inclined surface 161C. The slope angle of the second inclined portion 161Cb is steeper than that of the first inclined portion 161Ca.

With the first actuator 161-2 according to the second modified example, when the cam protruding portion 162C of the cam 162 slides up on the lower inclined surface 161C of the first actuator 161-2 toward the tip side, the sliding up speed of the cam protruding portion 162C can be changed in two steps.

For example, when the cam protruding portion 162C of the cam 162 slips up on the second inclined portion 161Cb of the lower inclined surface 161C, the sliding up speed of the cam protruding portion 162C can be made relatively fast because the inclination angle of the second inclined portion 161Cb is relatively steep.

In contrast, when the cam protruding portion 162C of the cam 162 slides up the first inclined portion 161Ca of the lower inclined surface 161C, the sliding up speed of the cam protruding portion 162C can be made relatively slow because the inclination angle of the second inclined portion 161Cb is relatively gentle.

Thus, with the first actuator 161-2 according to the first modified example, it is possible to increase the sliding start speed of the cam protruding portion 162C, and, for example, a failure, such as a snag at the start of sliding of the cam protruding portion 162C, can be made difficult to occur.

Furthermore, the first actuator 161-2 according to the first modified example is formed such that the lower inclined surface 161C has two inclined portions 161Ca and 161Cb so that the sliding up speed of the cam protruding portion 162C is the highest during the switching operation by the snap action.

Accordingly, with the first actuator 161-2 in the first modified example, the switching speed of the switching operation by the snap action can be increased, and an effect can be achieved, such as suppressing the generation of arc discharge in the switching operation.

Second Modified Example

Figure 34:
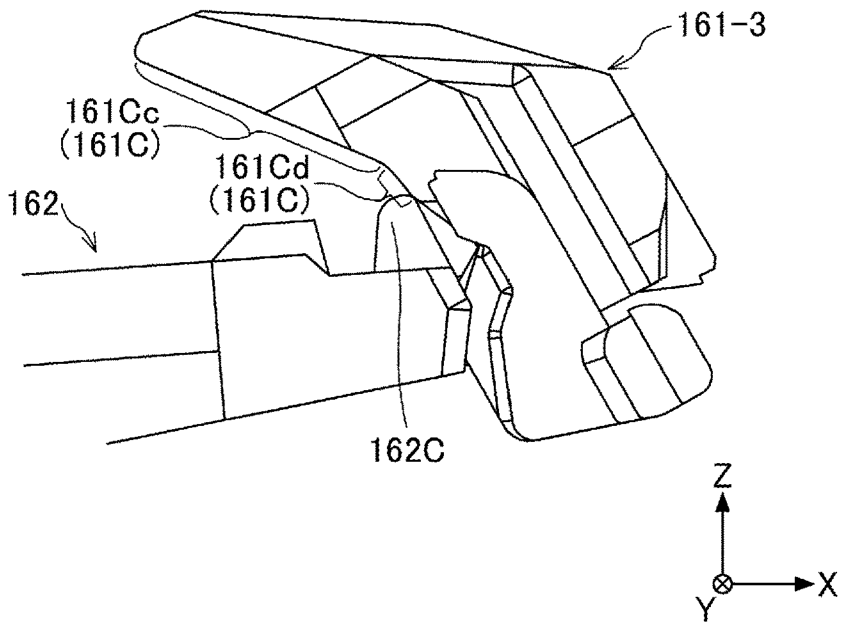
FIG. 34 is a side view of a first actuator according to a second modified example.

FIG. 34 is a side view of the first actuator 161-3 according to the second modified example. As illustrated in FIG. 33, in the first actuator 161-3 according to the second modified example, the shape of the lower inclined surface 161C differs from that of the first actuator 161, and the other configuration is the same as that of the first actuator 161.

The first actuator 161 has a planar shape with the lower inclined surface 161C having a constant inclination angle. In contrast, in the first actuator 161-3, the lower inclined surface 161C has a curved surface shape whose curvature gradually changes.

Specifically, the lower inclined surface 161C of the first actuator 161-3 has a curved shape with gradually increasing curvature and gradually decreasing inclination angle from the rear end (the end at the positive side in the X-axis direction) to the tip (the end at the negative side in the X-axis direction) of the lower inclined surface 161C.

More specifically, the lower inclined surface 161C of the first actuator 161-2 has a first inclined portion 161Cc with a relatively gentle inclination angle on the tip side (the negative side in the X-axis direction) of the lower inclined surface 161C, and the lower inclined surface 161C of the first actuator 161-2 has a second inclined portion 161Cd with a relatively gentle inclination angle that follows the first inclined portion 161Cc on the rear end side (the positive side in the X-axis direction) of the lower inclined surface 161C.

With the first actuator 161-3 according to the second modified example, when the cam protruding portion 162C of the cam 162 slides up on the lower inclined surface 161C of the first actuator 161-3 toward the tip side, the sliding acceleration of the cam protruding portion 162C can be gradually changed.

For example, when the cam protruding portion 162C of the cam 162 slides up on the second inclined portion 161Cd in the vicinity of the rear end of the lower inclined surface 161C, the sliding acceleration of the cam protruding portion 162C can be made relatively large because the slope angle of the second inclined portion 161Cd is relatively steep.

In contrast, when the cam protruding portion 162C of the cam 162 slips up the first inclined portion 161Cc in the vicinity of the tip of the lower inclined surface 161C, the sliding acceleration of the cam protruding portion 162C can be gradually reduced because the inclination angle of the first inclined portion 161Cc is relatively gentle.

Accordingly, with the first actuator 161-3 according to the second modified example, it is possible to increase the sliding start speed of the cam protruding portion 162C, and, for example, a failure, such as a snag at the start of sliding of the cam protruding portion 162C, can be made difficult to occur.

In particular, in the first actuator 161-3 according to the second modified example, the lower inclined surface 161C has a curved shape along the Brachistochrone curve (cycloid). The Brachistochrone curve (cycloid) is the curve that a point draws when a circle is rolled. For example, if a ball is rolled on a straight line, an arc, or the Brachistochrone curve (cycloid), the ball rolling on the Brachistochrone curve (cycloid) is the fastest one to reach the end point fastest.

Thus, with the first actuator 161-3 according to the second modified example, the time required for the cam protruding portion 162C to reach the tip of the lower inclined surface 161C can be shortened.

In the first actuator 161-3 according to the second modified example, the lower inclined surface 161C is formed in a curved shape along the Brachistochrone curve (cycloid) so that the sliding up speed of the cam protruding portion 162C is the highest when the switching operation by the snap action is performed.

Thus, with the first actuator 161-3 according to the second modified example, the switching speed of the switching operation by the snap action can be increased, and an effect can be achieved, such as suppressing the generation of arc discharge in the switching operation.

FIG. 35A through FIG. 35D are diagrams illustrating an example of the sliding up operation of the cam protruding portion 162C with respect to the first actuator 161-3 according to the second modified example.

As illustrated in FIG. 35A to FIG. 35D, in the first actuator 161-3 according to the second modified example, the lower inclined surface 161C is formed in a curved surface shape whose angle of inclination gradually decreases from the rear end (the end at the positive side in the X-axis direction) to the tip (the end at the negative side in the X-axis direction), and, in particular, the lower inclined surface 161C is formed in a curved surface shape along the Brachistochrone curve (cycloid).

Figure 35A:
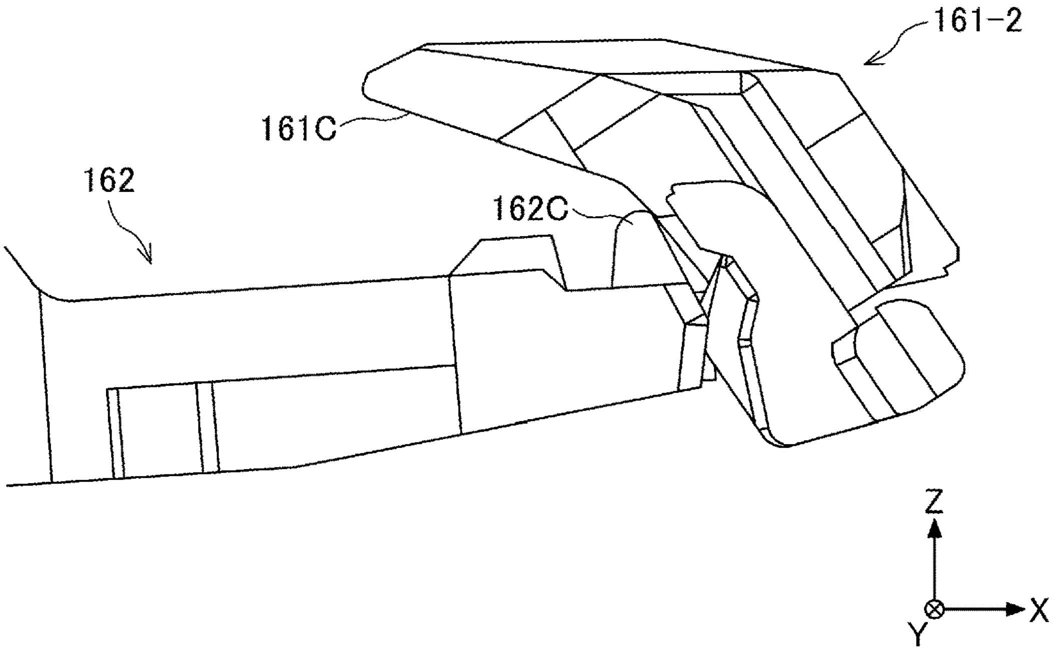
FIG. 35A is a diagram illustrating an example of a slide up motion of a cam protruding portion with respect to the first actuator according to the second modified example.
Figure 35B:
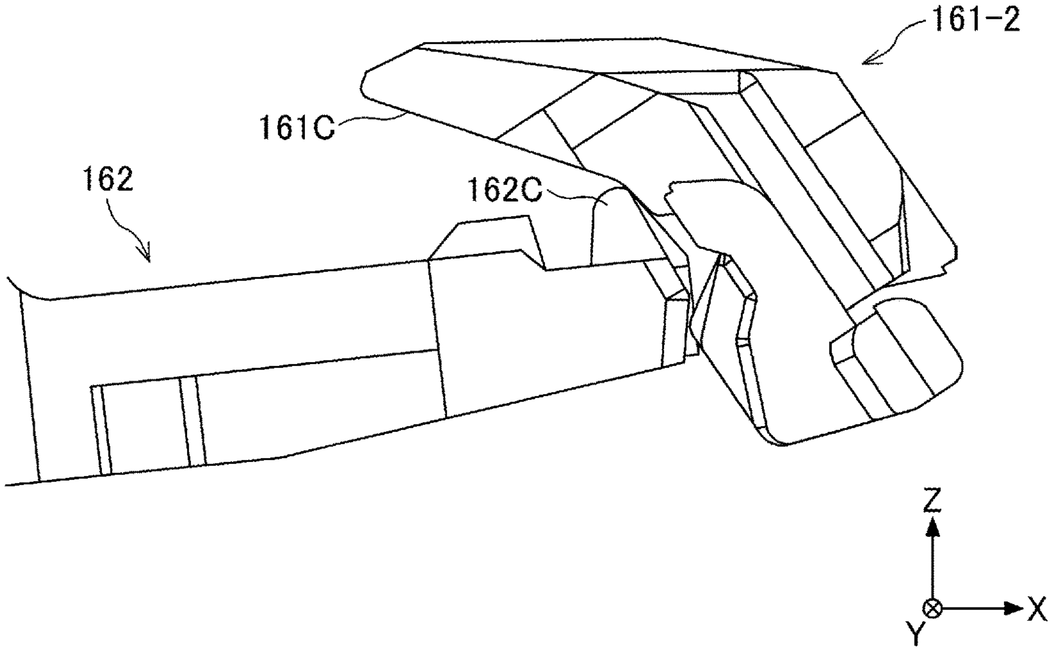
FIG. 35B is a diagram illustrating an example of a slide up motion of a cam protruding portion with respect to the first actuator according to the second modified example.

As illustrated in FIG. 35A and FIG. 35B, in the first actuator 161-3 according to the second modified example, the second inclined portion 161Cd (see FIG. 34) on the rear end side (the positive side in the X-axis direction) of the lower inclined surface 161C has a relatively steep inclination angle, and, thus, when the cam protruding portion 162C slides up on the second inclined portion 161Cd, the sliding acceleration of the cam protruding portion 162C can be made relatively large.

Figure 35C:
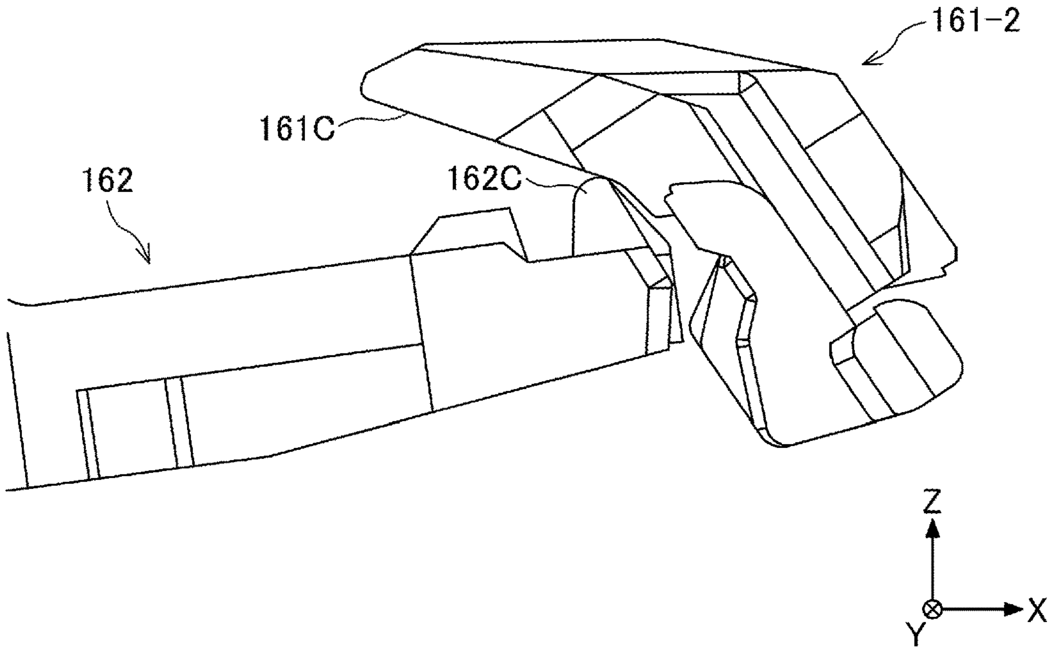
FIG. 35C is a diagram illustrating an example of a slide up motion of a cam protruding portion with respect to the first actuator according to the second modified example.
Figure 35D:
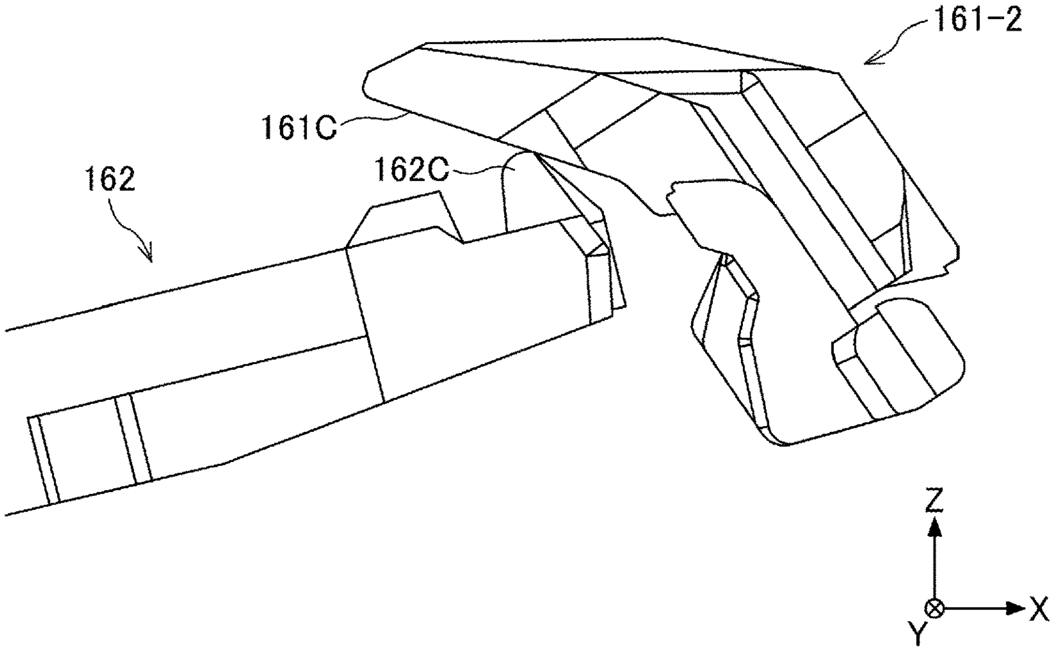
FIG. 35D is a diagram illustrating an example of a slide up motion of a cam protruding portion with respect to the first actuator according to the second modified example.

In contrast, as illustrated in FIG. 35C and FIG. 35D, in the first actuator 161-3 according to the second modified example, since the inclination angle of the first inclined portion 161Cc (see FIG. 34) at the tip side (the negative side in the X-axis direction) of the lower inclined surface 161C is relatively gentle, the sliding acceleration of the cam protruding portion 162C when the cam protruding portion 162C slides up on the first inclined portion 161Cc can be gradually reduced.

What is claimed is:

1. A selecting switch comprising:
- a case;
- a slider that slides in a vertical direction by being pushed down;
- a first actuator that rotates downward by being pushed down by the slider;
- a second actuator that holds a movable contact member;
- a first fixed contact and a second fixed contact to be contacted by the movable contact member;
- a cam protruding portion that is rotatably born by the second actuator and that contacts a lower inclined surface of the first actuator;
- a cam that rotates downward upon the cam protruding portion being pushed down while sliding on the lower inclined surface; and
- a biasing member that biases the cam upward,
- wherein, upon the first actuator being rotated downward by a predetermined angle, the cam protruding portion slides up on the lower inclined surface by biasing force from the biasing member, and the cam pulls up the second actuator, so that a contact of the movable contact member is switched from the first fixed contact to the second fixed contact.

2. The selecting switch according to claim 1, wherein, upon being pulled up by the cam, the second actuator switches the contact of the movable contact member from the first fixed contact to the second fixed contact while keeping the movable contact member in contact with a third fixed contact by rotating upward with a contact position between the movable contact member and the third fixed contact as a fulcrum.

3. The selecting switch according to claim 1, wherein the second actuator has a shaft support that supports a rotating shaft portion of the cam, and
- wherein the cam switches the contact of the movable contact member from the first fixed contact to the second fixed contact by pulling up the shaft support of the second actuator by the rotating shaft portion.

4. The selecting switch according to claim 1, wherein the second actuator is pressed against an inner bottom of the case by the biasing force from the biasing member.

5. The selecting switch according to claim 1, wherein, upon the slider being moved downward to a predetermined height position, the first actuator is restricted from a further downward rotation.

6. The selecting switch according to claim 5, wherein the slider has a slide groove in which an overhanging portion of the first actuator slides in the vertical direction, and wherein, upon the slider being moved downward to the predetermined height position, the overhanging portion contacts an upper end surface of the slide groove to restrict the further downward rotation of the first actuator.

7. The selecting switch according to claim 6, wherein the first actuator deviates from a rotating shaft upon the slider being moved downward to the predetermined height position.

8. The selecting switch according to claim 7, wherein, upon the slider being further moved downward from the predetermined height position after the first actuator deviates from the rotating shaft, the first actuator slides downward with the slider along a guide rib formed on an inner wall surface of the case while keeping a rotation angle fixed.

9. The selecting switch according to claim 8, wherein the guide rib has a second shaft portion at an upper end, and the first actuator has a lower bearing surface, wherein, upon the lower bearing surface riding on the second shaft portion, the first actuator is capable of rotating around the second shaft portion, and, wherein, upon the slider being moved downward to the predetermined height position, the lower bearing surface is dropped from the second shaft portion and the first actuator deviates from the rotating shaft.

10. The selecting switch according to claim 9, wherein, upon the slider being returned upward to the predetermined height position, an upper bearing surface of the first actuator abuts against a first shaft portion formed inside the case, and, wherein, upon the slider being further returned upward from the predetermined height position, the first actuator rotates upward around the first shaft portion by being pushed up by the cam protruding portion of the cam.

11. The selecting switch according to claim 10, wherein, upon the first actuator being rotated upward to the predetermined height position with the first shaft portion as a center of rotation, the cam releases pulling up of the second actuator as a result that the cam protruding portion slides up on the lower inclined surface by the biasing force from the biasing member, so that the contact of the movable contact member is switched from the second fixed contact to the first fixed contact.

12. The selecting switch according to claim 1, wherein the biasing member is a torsion spring.

13. The selecting switch according to claim 11, wherein the lower inclined surface has a polyhedral shape such that, as the cam protruding portion of the cam slides up, an inclination angle becomes smaller stepwise.

14. The selecting switch according to claim 11, wherein the lower inclined surface has a curved surface shape in which an inclination angle gradually decreases, as the cam protruding portion of the can slides up.

15. The selecting switch according to claim 14, wherein the lower inclined surface has the curved surface shape along a brachistochrone curve.

16. The selecting switch according to claim 14, wherein the lower inclined surface has the curved surface shape such that, at a timing at which the contact of the movable contact member is switched from the second fixed contact to the first fixed contact, a sliding up speed of the cam protruding portion becomes a highest speed.

* * * * *